(12) United States Patent
Hui et al.

(10) Patent No.: US 9,344,365 B1
(45) Date of Patent: May 17, 2016

(54) MESH NETWORK ADDRESSING

(71) Applicant: Google, Inc., Mountain View, CA (US)

(72) Inventors: Jonathan Wing-Yan Hui, Belmont, CA (US); Martin A. Turon, Berkeley, CA (US); James H. Woodyatt, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/798,451

(22) Filed: Jul. 13, 2015

Related U.S. Application Data

(60) Provisional application No. 62/111,510, filed on Feb. 3, 2015, provisional application No. 62/131,188, filed on Mar. 10, 2015.

(51) Int. Cl.
*H04L 12/28* (2006.01)
*H04L 12/747* (2013.01)
*H04L 29/12* (2006.01)

(52) U.S. Cl.
CPC .......... *H04L 45/742* (2013.01); *H04L 61/6059* (2013.01)

(58) Field of Classification Search
None
See application file for complete search history.

(56) References Cited

U.S. PATENT DOCUMENTS

| | | | |
|---|---|---|---|
| 6,865,611 B1 | 3/2005 | Bragg | |
| 7,257,104 B2 | 8/2007 | Shitama | |
| 7,308,495 B2 | 12/2007 | Ishiyama et al. | |
| 7,574,495 B1 | 8/2009 | Rajagopalan | |
| 7,633,855 B2 | 12/2009 | Singh et al. | |
| 7,894,433 B2 | 2/2011 | Ribiere et al. | |
| 8,073,968 B1 | 12/2011 | Shah et al. | |
| 8,260,922 B1 | 9/2012 | Aggarwal et al. | |
| 8,750,301 B2 | 6/2014 | Hu et al. | |
| 9,300,581 B1 | 3/2016 | Hui et al. | |
| 2005/0047348 A1 | 3/2005 | Suzuki et al. | |
| 2005/0265259 A1 | 12/2005 | Thubert et al. | |
| 2007/0030855 A1 | 2/2007 | Ribiere et al. | |
| 2007/0230410 A1 | 10/2007 | Thubert et al. | |
| 2009/0116393 A1 | 5/2009 | Hughes et al. | |
| 2010/0214979 A1 | 8/2010 | Kuehnel et al. | |
| 2011/0196961 A1* | 8/2011 | Wang | H04L 63/1458 709/224 |
| 2011/0235545 A1 | 9/2011 | Subramanian et al. | |
| 2012/0008578 A1 | 1/2012 | Kant et al. | |
| 2012/0052876 A1 | 3/2012 | Anderson et al. | |
| 2012/0131142 A1 | 5/2012 | Flinck | |
| 2012/0144031 A1 | 6/2012 | Hu | |
| 2012/0287932 A1 | 11/2012 | Haddad et al. | |
| 2012/0314714 A1* | 12/2012 | Hu | H04L 45/50 370/401 |

(Continued)

OTHER PUBLICATIONS

"First Action Interview Office Action", U.S. Appl. No. 14/798,448, Nov. 25, 2015, 4 pages.
"First Action Interview Office Action", U.S. Appl. No. 14/798,455, Dec. 9, 2015, 7 pages.

(Continued)

*Primary Examiner* — Otis L Thompson, Jr.
(74) *Attorney, Agent, or Firm* — Wolfe-SBMC

(57) ABSTRACT

In embodiments of mesh network addressing, a router receives a packet to deliver to a network destination and determines if the network destination is within the mesh network. The network destination enables the router to discover a Routing Locator (RLOC) that is associated with the network destination and provides a routable network address for the network destination. The router can forward the received packet using the routable network address from the discovered Routing Locator. The router can discover the RLOC by searching a cache of RLOCs stored in the router, or by sending an address query.

20 Claims, 17 Drawing Sheets

(56) References Cited

U.S. PATENT DOCUMENTS

| | | | |
|---|---|---|---|
| 2013/0028095 A1 | 1/2013 | Vasseur et al. | |
| 2013/0103819 A1* | 4/2013 | Meyer | H04L 9/00 709/223 |
| 2013/0151704 A1 | 6/2013 | Chandolu et al. | |
| 2013/0198369 A1 | 8/2013 | Kim et al. | |
| 2014/0098819 A1 | 4/2014 | You et al. | |
| 2014/0247727 A1 | 9/2014 | Schick et al. | |
| 2014/0321459 A1 | 10/2014 | Kumar et al. | |
| 2015/0067130 A1 | 3/2015 | Naseh et al. | |
| 2015/0092535 A1 | 4/2015 | Kelsey | |
| 2015/0207724 A1 | 7/2015 | Choudhury et al. | |
| 2015/0236944 A1* | 8/2015 | Kano | H04L 45/04 370/401 |

OTHER PUBLICATIONS

"Non-Final Office Action", U.S. Appl. No. 14/798,452, Oct. 16, 2015, 14 pages.

"Notice of Allowance", U.S. Appl. No. 14/798,456, Nov. 17, 2015, 7 pages.

"Pre-Interview Communication", U.S. Appl. No. 14/798,448, Oct. 21, 2015, 4 pages.

"Pre-Interview Communication", U.S. Appl. No. 14/798,455, Oct. 22, 2015, 4 pages.

"Corrected Notice of Allowance", U.S. Appl. No. 14/798,456, Feb. 22, 2016, 2 pages.

"Notice of Allowance", U.S. Appl. No. 14/798,448, Apr. 11, 2016, 9 pages.

\* cited by examiner

MESH NETWORK ADDRESSING

CROSS REFERENCE TO RELATED APPLICATIONS

This application claims priority under 35 U.S.C. §119(e) to U.S. Provisional Patent Application Ser. No. 62/111,510 filed Feb. 3, 2015, the disclosure of which is incorporated by reference herein in its entirety. This application also claims priority under 35 U.S.C. §119(e) to U.S. Provisional Patent Application Ser. No. 62/131,188 filed Mar. 10, 2015, the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. However many devices on mesh networks are designed to operate for extended periods of time on battery-power, which limits the available computing, user interface, and radio resources in the devices. Additionally, some mesh network devices may sleep periodically to reduce power consumption and are not in constant radio contact with the mesh network to receive data packets. However, with the increasing ubiquity and interconnectedness of mesh networks, network addressing techniques limit the efficiency, flexibility, and redundancy of routing data packets within mesh networks and between mesh network devices and external network devices and services.

SUMMARY

This summary is provided to introduce simplified concepts of mesh network addressing, generally related to addressing and routing. The simplified concepts are further described below in the Detailed Description. This summary is not intended to identify essential features of the claimed subject matter, nor is it intended for use in determining the scope of the claimed subject matter.

Mesh network addressing, generally related to addressing and routing packets in a mesh network, is described. In embodiments, a border router receives an address prefix and associated configuration information from an external network. The received address prefix and the configuration information enable the border router to create a provisioning domain that includes the received address prefix and the configuration information, as well as a unique identifier. The border router forwards the created provisioning domain to a leader device in the mesh network that stores the provisioning domain and propagates the provisioning domain, as well as any other provisioning domains, as a part of network data for the mesh network. The provisioning domains enable routers, end devices, or hosts in the mesh network to select routes for addressing packets to destination addresses. In implementations, the provisioning domain includes a Routing Locator (RLOC) for the border router to enable the routers to forward packets to the external network using the border router.

Mesh network addressing, generally related to addressing and routing packets in a mesh network, is described. In embodiments, a router can receive a packet to deliver to a network destination and determine if the network destination is within the mesh network. The network destination enables the router to discover a Routing Locator (RLOC) that is associated with the network destination and that provides a routable network address for the network destination. The router forwards the received packet using the routable network address from the discovered Routing Locator. In implementations, the router can discover the RLOC in various manners including searching a cache of RLOCs stored in the router, or by sending an address query over the mesh network.

Mesh network addressing, generally related to addressing and routing packets in a mesh network, is described. In embodiments, a router registers an address for an end device and assigns a child identifier to the end device. The router can encode an Endpoint Identifier (EID) of the end device, and a router identifier of the router into the Endpoint Identifier, which the router incorporates into a Routing Locator (RLOC) for the end device. The router receives an address query for the end device, over the mesh network, and responds to the address query on behalf of the end device, with a response that includes the RLOC for the end device. The router can receive data packets on behalf of the end device and store the data packets for the end device until the router can forward the data packets to the end device.

Mesh network addressing, generally related to addressing and routing packets, is described. In embodiments, a router device receives provisioning domains, which each include an address prefix and an associated preference value for the address prefix. The router can determine a route, based on one of the address prefixes, to use to forward a data packet to a destination. The router can use the preference values to prioritize the routing of the data packet. In other aspects, the preference values can be set based on one or more factors, and the router can use the preference values in addition to mesh network routing costs to determine a route for a data packet.

Mesh network addressing as generally related to duplicate address detection in a mesh network, is described. In embodiments, an end device of the mesh network can generate an address identifier that includes an address and time-based information associated with the end device, which is attached to a router device for communication in the mesh network. The address identifier may also include a random value generated by the end device. The address identifier is maintained by the router device as a tuple state of the end device. The end device or the router device can initiate an address query requesting that mesh network devices in the mesh network having a designated address respond with the tuple state that corresponds to the designated address. The end device or router device receives the tuple state of mesh network devices having the designated address in response to the address query. The end device or the router device can then compare the time-based information in the tuple states of the mesh network devices to the time-based information in the tuple state of the end device and detect a duplicate address of a mesh network device based on the time-based information. The end device or the router device can then direct one or more of the mesh network devices that have the duplicate address to generate a new address.

BRIEF DESCRIPTION OF THE DRAWINGS

Embodiments of mesh network addressing are described with reference to the following drawings. The same numbers are used throughout the drawings to reference like features and components.

DETAILED DESCRIPTION

Figure 1:
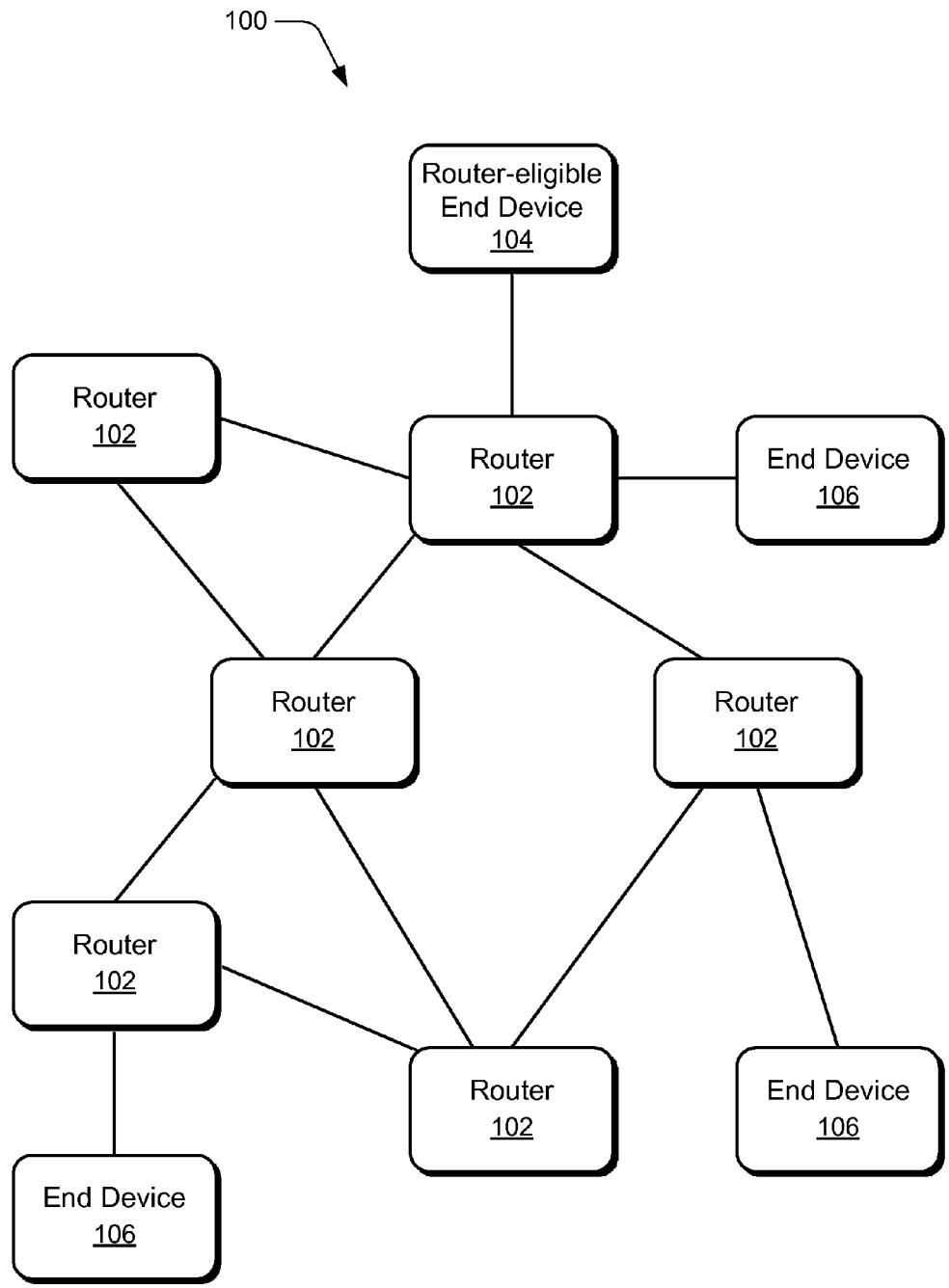
FIG. 1 illustrates an example mesh network system in which various embodiments of mesh network addressing can be implemented.

Wireless mesh networks are communication networks having wireless nodes connected in a mesh topology that provides reliable and redundant communication paths for traffic within a mesh network. Wireless mesh networks use multiple radio links, or hops, to forward traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks.

While many standards-based technologies have been developed for addressing and routing of data packets in networks, such as Internet Protocol (IP) networks, these technologies do not provide complete solutions for addressing and routing packets for mesh networks. For example, a mesh network may be connected to multiple external networks, which each provide different sets of network configuration data that can be used by mesh network devices to address and route data packets. However, the mesh network device is left to decide which set of network configuration data to use, or how to merge the different, potentially conflicting, items of configuration information from the different sets of network configuration data to address data packets.

Establishing provisioning domains to identify, store, and propagate network configuration data for the mesh network provides consistent management of network configuration data for different external networks. When the mesh network device uses network configuration data from a given provisioning domain, inconsistent or conflicting use (e.g., from mixing network configuration data) is prevented. Various embodiments provide mesh network addressing techniques to improve the management and use of network configuration data.

Addressing and routing techniques for a mesh network may create routing inefficiencies and may create a single point of failure for the mesh network. For example, a border router that connects the mesh network to an external network of an Internet Service Provider (ISP) may receive an address prefix and associated network configuration data from the ISP. A Dynamic Host Configuration Protocol (DHCP) server in the border router maps mesh network device addresses to network addresses for routing, using the address prefix supplied by the ISP.

When network address lookups in the mesh network go through the DHCP server, routing inefficiencies are created and the DHCP server becomes a potential single point of failure for the mesh network. Also, requiring a DHCP server to configure IPv6 addresses creates a potential single point of failure for the mesh network. If the DHCP server fails, mesh network devices cannot obtain IPv6 addresses. Mesh network addressing techniques are described that provide on-mesh global addressing for data packets without the need for a centralized service to determine destination addresses for data packets within, and outside, the mesh network.

Many devices for mesh networks, such as sensors, are designed for low-power, battery operation over long periods of time, such as months or years. To achieve long service life, a battery-powered mesh device may turn off, or sleep, many functions, such as radio and network interfaces, for periods of time. During sleep periods, the mesh device is not available on the mesh network to receive packets addressed to it.

Many network addressing and routing techniques fail to deliver data packets to such a sleeping device and may indicate, to the sender of the packet that the delivery to the sleeping device failed. Mesh network addressing techniques are described that provide address registration for sleeping child end devices with a parent router device, which provides a routing destination and responds to address queries on behalf of the end device. The parent router device stores received data packets for the sleeping end device until the end device is awake to receive the data packets.

Packets in mesh networks may be routed based on routing costs. For example, routing costs may be based on one, or a combination of, characteristics of a route, such as a number of links in a routing path, or a measure of link quality. The routing costs may not fully describe the information needed to prioritize routing a data packet over one route relative to another. Mesh network addressing techniques are described that associate preferences with address prefixes to prioritize routing of data packets based on the preferences.

Devices in a mesh network may use processes to randomly generate an address in a decentralized manner without knowledge of the set of other addresses in use in the mesh network. As the topology of a mesh networks varies over time, devices may attach to different routers and create additional addresses. As addresses are propagated within the mesh network, duplicate addresses, created by different mesh devices, may create routing problems when addresses are not unique among the mesh devices. Mesh network addressing techniques are described detect duplicate addresses in the mesh network.

While features and concepts of the described systems and methods for mesh network addressing can be implemented in any number of different environments, systems, devices, and/or various configurations, embodiments of mesh network addressing are described in the context of the following example devices, systems, and configurations.

FIG. 1 illustrates an example mesh network system 100 in which various embodiments of mesh network addressing can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the mesh network interface. The routers 102 also route traffic across the mesh network 100.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional mesh network devices. The end devices 106 are devices that can communicate using the mesh network 100, but lack the capability, beyond simply forwarding packets to its parent router 102, to route traffic in the mesh network 100. For example, a battery-powered sensor is one type of end device 106.

Some end devices 106 may power down (i.e., sleep) some operations or hardware for a portion of the time the end device 106 is operational. For example, the end device 106 may power down radios or network interfaces, to conserve power between operations that require a connection to the mesh network 100. For example, a battery-powered temperature sensor may only be awake periodically to transmit a report of temperature, and then the temperature sensor sleeps until the next time the temperature sensor reports. When the end devices 106 sleep, the end devices 106 are not actively connected to the mesh network 100 to response to address queries or to receive data packets over the mesh network 100.

Figure 2:
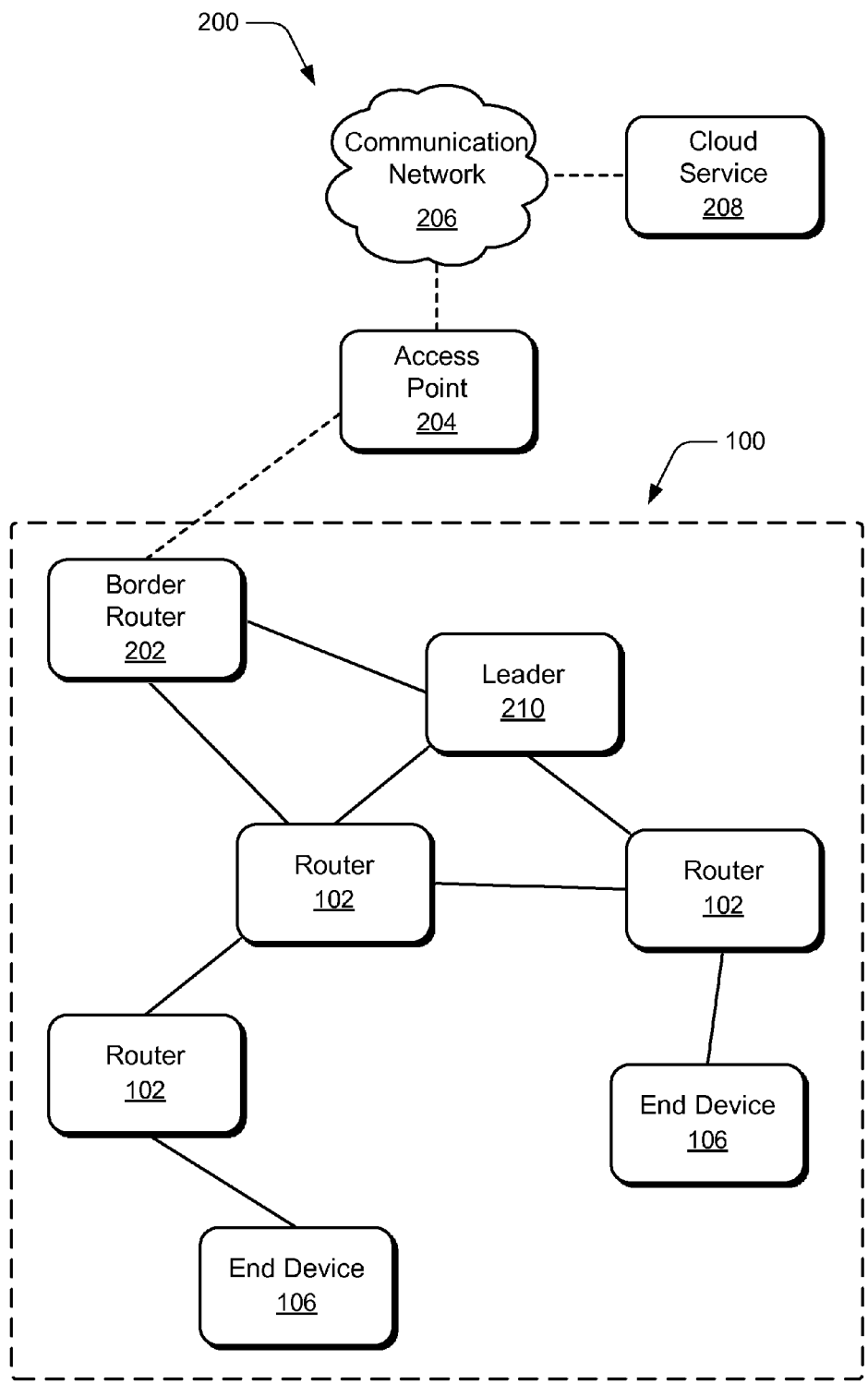
FIG. 2 illustrates an example environment in which various embodiments of mesh network addressing can be implemented.

FIG. 2 illustrates an example environment 200 in which various embodiments of mesh network addressing techniques can be implemented. The environment 200 includes the mesh network 100, in which some routers 102 are performing specific roles in the mesh network 100.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, a cellular base station, or any other suitable device for bridging different types of networks. Although a single border router 202 is shown in FIG. 2, for the sake of clarity, the mesh network 100 may have any number of border routers 202, which may connect to any number of external networks. In another implementation, an end device 106 may operate as a border router 202. In this case the end device operating as the border router 202 is routing traffic between the mesh network 100 and an external network, but not routing traffic between other mesh network devices.

The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

One of the routers 102 performs the role of a leader 210 for the mesh network 100. The leader 210 manages router identifier assignment, is the central arbiter of network configuration information, and propagates network data, which includes the network configuration information, for the mesh network 100.

Figure 3:
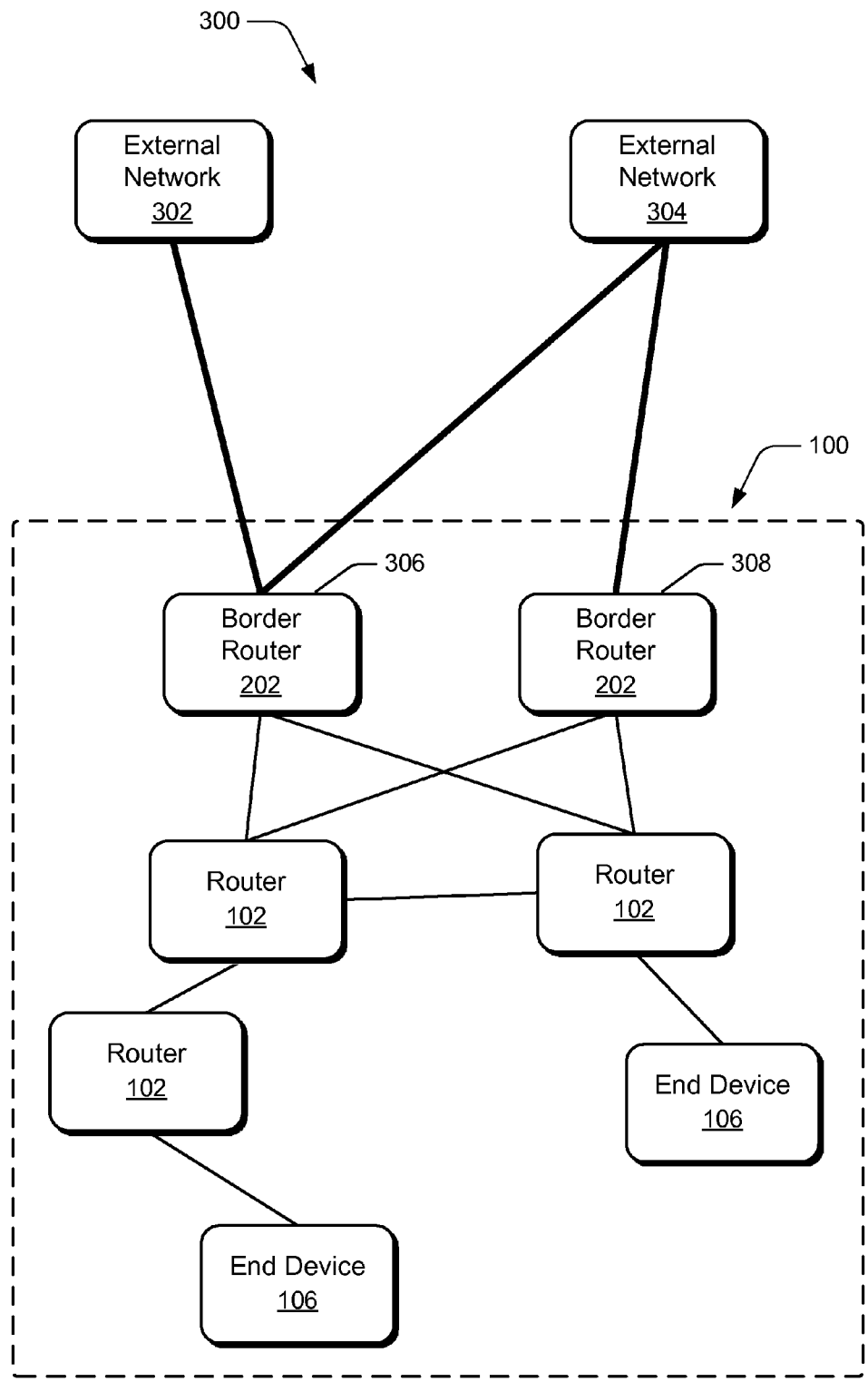
FIG. 3 illustrates an example environment in which various embodiments of mesh network addressing techniques can be implemented.

FIG. 3 illustrates an example environment 300 in which various embodiments of mesh network addressing techniques can be implemented. The environment 300 illustrates the mesh network 100 connected to two external networks, 302 and 304. In this example, two external networks are shown, but any number of physical or virtual networks may be connected to the mesh network 100 using any suitable networking technology. FIG. 3 also illustrates that each of the external networks 302 and 304 are connected to the mesh network 100 by one or more border routers 202, as shown at 306 and 308. Any border router 202 may connect to any number of the external networks. Any external network may also connect to the mesh network 100 through any number of the border routers 202.

Provisioning Domains

Figure 4:
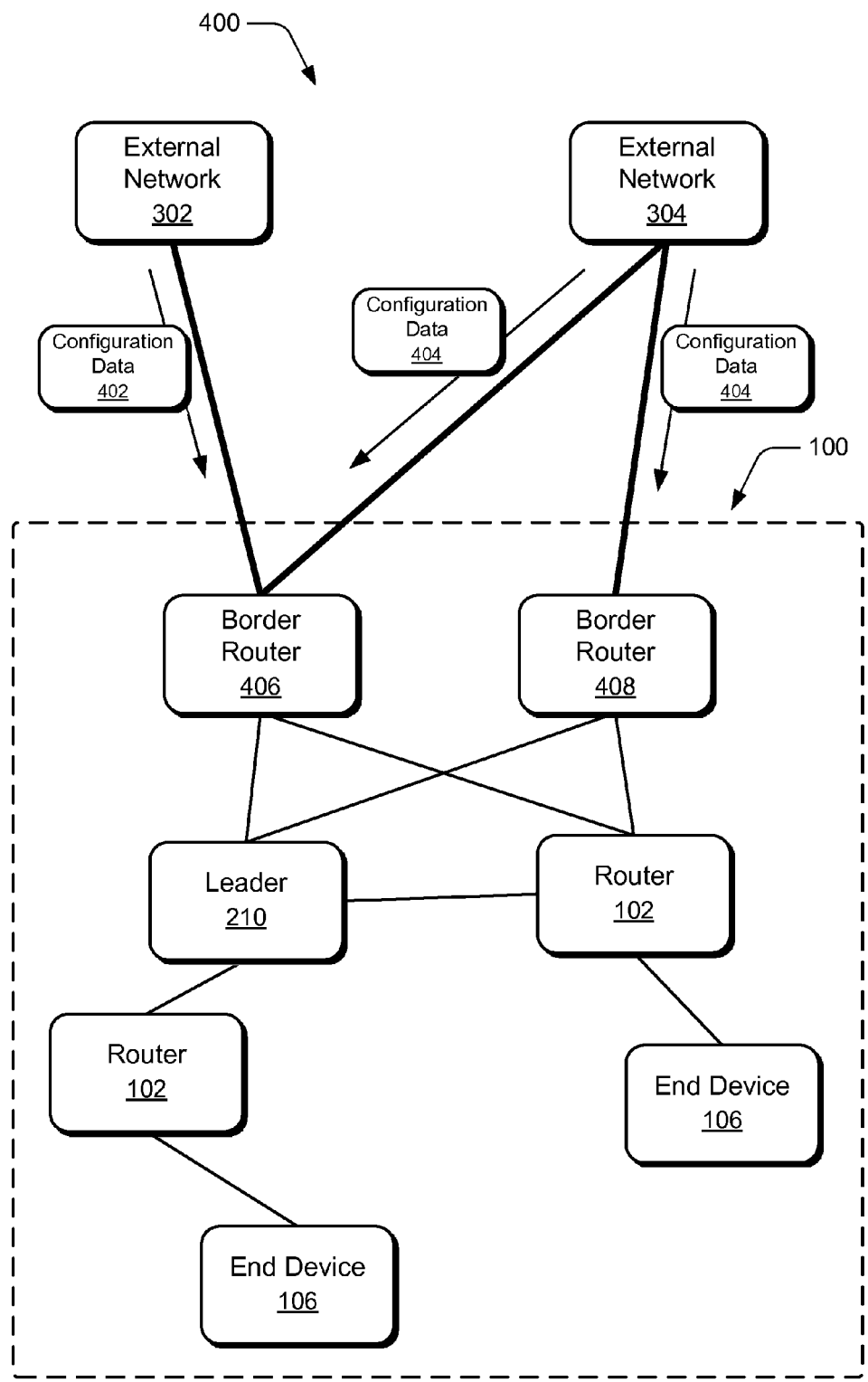
FIG. 4 further illustrates an example environment 400 in which various embodiments of mesh network addressing techniques can be implemented.

FIG. 4 illustrates an example environment 400 in which various embodiments of mesh network addressing techniques can be implemented. The environment 400 includes the mesh network 100 illustrated as receiving network configuration data from the external networks 302 and 304. The external network 302 provides configuration data 402 to a border router 406. The configuration data 402 is associated with an address prefix assigned by the external network 302 to the mesh network 100 and the address prefix is available on the mesh network 100 for addressing and routing data packets. The external network 304 provides configuration data 404 to the border router 406 and to a border router 408. The configuration data 404 is associated with an address prefix assigned by the external network 304 to the mesh network 100 and the address prefix is available on the mesh network 100 for addressing and routing data packets.

Any mesh network device may use the configuration data 402 or the configuration data 404 to address and route data packets. Provisioning domains are used to assure that any potentially conflicting combination of configuration information drawn from the configuration data 402 and the configuration data 404 is not used for addressing a data packet to a destination. The provisioning domain is a consistent set of configuration information for the mesh network 100 provided by one or more of the border routers 202. By way of example and not limitation, the configuration information in the provisioning domain may include an on-mesh prefix, network address configuration information, external routes, and/or other network configuration information.

The provisioning domain associates items of network configuration information that are used together. Use of the network configuration information stored in multiple provisioning domains is mutually exclusive (i.e., a mesh network device uses network configuration information from only a single provisioning domain at a time.)

In an embodiment, the network configuration information in a particular provisioning domain may be supplied by a single border router 202. Alternatively, multiple border routers 202 may each supply a subset of the information included in any particular provisioning domain, in which case the provisioning domain is the collection of the subsets of network configuration information supplied by the multiple border routers 202.

The provisioning domains for the mesh network 100 are maintained as tuples by the leader 210. Each of the provisioning domains is identified by a unique identifier included in the tuple. The leader 210 propagates the provisioning domains to the routers 102 and the router-eligible end devices 104 in the mesh network 100. For example, the leader 210 may propagate the provisioning domains in network data of the mesh network 100 using any suitable protocol, such as Multicast Protocol for Low Power and Lossy Networks (MPL), or multicasting an MLE-UPDATE message.

By way of example, and not limitation, the tuple for the provisioning domain includes a network address prefix (e.g., an IPv6 address prefix), a unique provisioning domain identifier with which the tuple is associated, a Routing Locator (RLOC) for the border router 202 that makes the network address prefix available to the mesh network 100, a number of configuration flags for the provisioning domain, and/or a router preference value.

The configuration flags in the tuple may include one or more flags to indicate that: the route in the provisioning domain will be stable for a minimum period of time, mesh network devices are allowed to auto-configure addresses using the network address prefix, mesh network devices are allowed to use previously configured addresses using the network address prefix, the border router 202 associated with the provisioning domain manages address configuration for the network address prefix, the border router 202 associated with the provisioning domain supplies other network configuration data (e.g., Domain Name Service (DNS) servers), and/or the border router 202 associated with the provisioning domain provides a default route for data packets with a source using the network address prefix.

Mesh Network Address Architecture

In the mesh network 100, a link-local scope may be defined by a set of mesh network interfaces (mesh network devices) that are reachable with a single radio transmission. In other words, the link-local scope includes the mesh network devices that connect directly to each other within the mesh network 100.

The mesh network devices use link-local addresses to reach the mesh network devices within range of the single radio transmission. The mesh network devices use the link-local addresses to discover neighbors, configure links, and/or exchange routing information. In certain embodiments, the mesh network device is assigned the link-local address with an interface identifier derived from an IEEE 802.15.4 Extended Address of the Media Access Control (MAC) layer of the IEEE 802.15.4 network stack. For example, the mesh network device assigns a link-local IPv6 address with an Interface Identifier (IID) that is obtained by computing a SHA-256 hash of the IEEE 802.15.4 Extended Address, and taking the first eight bytes of that SHA-256 hash as the IID. When attached to the mesh network 100, the mesh network device assigns the link-local IPv6 address the same IID as an RLOC assigned to the mesh network device.

In the mesh network 100, a mesh network local (i.e., Mesh-Local or Realm-Local) scope is defined by the set of the mesh interfaces (mesh network devices) participating within the same mesh network 100, through any number of radio transmissions. Moreover, all the mesh interfaces within the same Mesh-Local scope share the same mesh commissioning parameters (i.e., a master key, an extended Personal Area Network Identifier (PANID), and a Mesh-Local prefix) and are actively participating in the same mesh network 100. Mesh network devices form Mesh-Local addresses out of the Mesh-Local prefix.

The mesh network devices use the Mesh-Local addresses to reach other mesh network devices within the same mesh network 100. When the mesh network device is attached to the mesh network 100, there are two Mesh-Local addresses assigned to the mesh network device. The first is a Routing Locator (RLOC), which includes a prefix that is the Mesh-Local Unique Local Address (ULA) Prefix, and an Endpoint Identifier (EID), which also includes a prefix that is the Mesh-Local ULA Prefix. The RLOC is an encoding of a Router Identifier (Router ID) of a parent router 102 and Child Identifiers (Child IDs) of the end devices 106 that are children of the parent router 102. The second assigned Mesh-Local address is Mesh-Local Endpoint Identifier (ML-EID), which is an EID where the prefix is the Mesh-Local ULA Prefix and the Interface Identifier (IID) is chosen at random.

In addition to unicast Mesh-Local addresses and Mesh-Local multicast addresses, the mesh network 100 supports anycast addressing. The mesh network 100 uses IPv6 Anycast addresses to communicate with mesh network DHCPv6 Agents. A Mesh-Local Prefix-based DHCPv6 Agent Anycast address is defined that is used by the end devices 106 to reach a DHCPv6 Agent for a given prefix. The prefix-based DHCPv6 Agent Anycast address is an RLOC formed using the Mesh-Local ULA Prefix and the Interface Identifier and has the form 0000:00FF:FE00:FC0n, where 'n' is an IPv6 over Low power Wireless Personal Area Networks (6LoWPAN) Context ID assigned to an on-mesh prefix that the border router 202 serves.

The mesh network 100 also uses an IPv6 Anycast addresses to communicate with mesh network servers. A mesh network server is any mesh device that contributes network data to the leader 210, for example a border router 202, a DHCP server, and so forth. A Mesh-Local Service Anycast address is defined, which the end devices 106 may use to reach a given type of mesh network server. The Mesh-Local Service Anycast address is an RLOC formed using the Mesh-Local Prefix and the interface identifier has the form 0000:00FF:FE00:FCmn where 'mn' is a Service Type ID plus sixteen.

The mesh network devices also assign unicast addresses that have larger scope than the Mesh-Local scope. Within the mesh network 100, global unicast addresses (GUA) are used to enable communication with devices outside the mesh network 100 (e.g., over logically connected networks, such as Wi-Fi or via the Internet). The global unicast addresses may include any IPv6 unicast address that has a scope greater than the Mesh-Local scope. The provisioning domains in the network data indicate global prefixes that may be used when configuring global addresses. For example, a mobile device connected to an external network may connect to a device on the mesh network 100 through an external network connection, via a border router 202, using global addresses.

The provisioning domains indicate one or more on-mesh prefixes assigned to the mesh network 100. In an embodiment, the mesh network devices may assign a global address out of an on-mesh prefix. Alternatively, if the network data of the mesh network 100 indicates the presence of one or more DHCPv6 servers on the mesh network 100, the mesh network devices may assign a global address using DHCPv6.

In some embodiments, all the mesh network devices in the mesh network 100 use a number of different unicast addresses for communication (e.g., IPv6 unicast addresses). For addresses that have a scope larger than the Link-Local scope, the mesh network 100 may define two different types of addresses: Routing Locators (RLOCs) and Endpoint Identifiers (EIDs).

The RLOC is a network address (e.g., IPv6 address) that identifies the location of a particular mesh network device within the mesh network 100. In some embodiments, the RLOC is only used by the mesh network devices for communicating control traffic and delivering datagrams (e.g., IPv6 datagrams, UDP transmissions, and so forth) to their intended destinations. In such embodiments, applications generally do not have visibility to or use RLOCs.

A unicast RLOC has the Mesh-Local scope and encodes the Router ID and the Child ID in an Interface Identifier. As an example and not a limitation, the prefix for the unicast RLOC is the Mesh-Local prefix and the Interface Identifier, and has the form 0000:00FF:FE00:xxxx, where 'xxxx' is a 16-bit value that embeds the Router ID and the Child ID.

A mesh network Endpoint Identifier (EID) is a network address (e.g., an IPv6 address) that uniquely identifies a given mesh network device within the mesh network 100 and is independent from topology changes in the mesh network 100. Other than the RLOC, the mesh network 100 considers all other unicast addresses (such as IPv6 unicast addresses) that have the same or larger scope than the Mesh-Local scope as Endpoint Identifiers. The Endpoint Identifier is independent from the position of the mesh network device within the mesh network 100 and does not change in response to topology changes in the mesh network 100.

The EID provides a stable identifier for the mesh network device within the mesh network 100. However, the EID is not directly routable because the mesh routing protocol only exchanges route information for RLOCs. To deliver a datagram, such as an IPv6 datagram, with an EID as the IPv6 Destination Address, a mesh network device performs an EID-to-RLOC mapping lookup.

For example, the mesh network device receives a data packet with a Destination Address, which includes an IPv6 address prefix that indicates that the address has an associated on-mesh RLOC. The mesh network device can determine that there is an associated on-mesh RLOC by comparing the received IPv6 address prefix to the address prefixes in the provisioning domains propagated within the mesh network 100, as described above.

If the mesh network device determines that the Destination Address is associated with an on-mesh address prefix, the mesh network device discovers an EID-to-RLOC mapping for the received address. The EID-to-RLOC mapping is found any suitable manner, such as searching in a cache of EID-to-RLOC mappings stored by the mesh network device or multicasting an address query to all routers 102 and/or router-eligible end devices in the mesh network 100.

In an embodiment, the mesh network device includes an address query set that caches the EID-to-RLOC mappings. The address query set of EID-to-RLOC mappings includes EID-to RLOC mappings obtained from the address queries initiated by the mesh network device. The address query set may also include EID-to-RLOC mappings obtained opportunistically by observing mesh network traffic routed through the mesh network device, and storing the EID-to-RLOC mappings, from the observed traffic, in the address query set.

In an embodiment, the mesh network device multicasts an address query message including the EID, for which the EID-to-RLOC mapping is sought, over the mesh network 100. The address query message is multicast to all the routers 102 and the router-eligible end devices 104. The address query message is multicast using a multicast address designating that the address query message is addressed to all the routers 102 and the router-eligible end devices 104 in the mesh network 100. Any router 102 and/or router-eligible end device 104 that has an EID-to-RLOC mapping, for the EID in the address query message, responds to the address query message by sending the associated EID-to-RLOC mapping to the mesh network device that initiated the address query.

To improve address query performance and reduce network traffic, the mesh network device may limit the number of hops for the multicast of the address query message. For example, the end device 106 may only need to transmit the address query message over a single hop to reach the parent router 102 to obtain the desired EID-to-RLOC mapping. If the desired EID-to-RLOC mapping is not returned from the address query multicast over a limited number of hops, the mesh network device multicasts the address query message over a larger number of hops, such as multicasting to the entire mesh network 100.

Additionally, to improve the speed of EID-to-RLOC mapping lookups and reduce network traffic, the mesh network device may combine the above-described embodiments in any suitable fashion, such as searching the address query set and then multicasting the address query, if the search of the address query set fails to return the EID-to-RLOC mapping for the given EID.

Because the EIDs remain stable in the face of topology changes in the mesh network 100, it is be preferable for application programs to use the EIDs when communicating with the mesh network devices. However, in some embodiments, application programs may use RLOCs directly for simple request-response communication patterns within the mesh network 100.

In the mesh network 100, multicast addressing includes various multicast groups. Multicast delivery depends on the type of device and registration of a multicast address in the mesh network. For example, an all-nodes multicast group that includes both powered mesh network devices and mesh network devices that sleep for periods of time, such as battery-powered sensors, or an all-routers multicast group includes both the routers 102 and the router-eligible end devices 104. Multicast groups are defined at various scopes, such as link-local and Realm-local scopes. For example, each of the mesh network devices subscribes to a link-local all-nodes multicast address (e.g., ff02::1). The mesh network devices operating as a router 102, a router-eligible device 104, or a border router 202 subscribe to a link-local all-routers multicast address (e.g., ff02::2). In another example, each of the mesh network devices subscribes to a Realm-local all-nodes multicast address (e.g., ff03::1). The mesh network devices operating as a router 102, a router-eligible device 104, or a border router 202 subscribe to a Realm-local all-routers multicast address (e.g., ff03::2).

With respect to multicast addresses with the global scope, the border routers 202 may limit or restrict forwarding of multicast packets from the external networks into the mesh network 100. For example, the border routers 202 may restrict forwarding multicast packets from higher-bandwidth external networks to avoid overwhelming the capacity of the mesh network 100. However, the border routers 202 may selectively forward multicast packets from the external networks, into the mesh network 100, when such multicasts are appropriate for the mesh network 100, such as a multicast packet from the cloud service 208 that is associated with an application that uses the mesh network 100.

End Device Addressing

Many types of the end devices 106, such as sensors, are designed for low-power, battery operation for long periods of time, such as months or years. To achieve long service life a battery-powered mesh device may turn off, or sleep, many operations such as radio and network interfaces for periods of time. The end devices 106 can communicate using the mesh network 100, but lack the capability, beyond simply forwarding to the parent router 102, to route traffic in the mesh network 100. As such, this type of device may referred to as a Reduced Function Device (RFD) or a sleepy child device. During sleep periods, the end device 106 is not available on the mesh network 100 to receive data packets addressed to the end device 106.

When the end device 106 attaches to the parent router 102, an address registration for the end device 106 assigns the Child ID to the end device 106. Using the assigned Child ID and the Router ID of the parent router 102, the parent router 102 responds, on behalf of the child end device 106, to mesh network traffic addressed to the child end device 106.

When the end device 106 registers with the parent router 102, the end device 106 registers multicast addresses with the parent router 102. For example, by default the parent router 102 does not queue multicast messages for the child end device 106. By registering the multicast addresses, the parent router can determine which multicast messages are of interest the child device 106 and the parent router 102 queues those multicast messages on behalf of the child end device 106. In an embodiment, some multicast addresses are mandatory for mesh network devices and are implicitly registered for each mesh network device. For the child end device 106, the mandatory multicast addresses are implicitly registered with the parent router 102. Multicast messages for these mandatory multicast addresses are queued by the parent router 102 for the child end device 106.

Routing of packet data in the mesh network 100 is based on RLOCs that are mapped to EIDs. For the child end device 106 that is attached to the parent router 102, the router ID, of the parent router 102 and the Child ID, of the child end device 106, are encoded into an Interface Identifier (IID). For example, the Router ID is encoded into a first subset of bit fields in the IID and the Child ID is encoded into a second subset of bit fields in the IID. By way of example and not limitation, the Router ID is encoded into bits 0-5 of a 16-bit IID and the Child ID is encoded into bits 7-15 of the IID. Any given router 102 may have multiple child end devices 106 registered at any given time.

The RLOC for each end device 106 is encoded with Mesh-Local scope from the encoded Router ID and Child ID in the IID. The RLOC for the end device 106 is used by the mesh network devices to address and route data packets to the end device 106. When a data packet is addressed using such an RLOC, the data packet is routed in the mesh network 100 to the parent router 102 of the child end device 106, which is important in the cases where the end device 106 sleeps for periods of time. In cases where the end device 106 does not sleep, the parent router 102 may respond with the RLOC for the child end device 106, which will allow packets to be sent directly to the child end device 106.

The parent router 102 responds to any message addressed to the child end device 106. For example, the parent router 102 responds to any address query, containing the EID of the child end device 106, with the RLOC for the child end device 106.

The child end device 106 operates as a host-only device and forwards all packets to the parent router 102 for communication across the mesh network 100 and/or external networks. For example, the child end device 106 does not resolve an EID to an RLOC. The child end device 106 depends on the parent router 102 to perform the resolution. The child end device 106 depends on the parent router 102 to select the border router 202 for packets with a destination outside the mesh network 100.

The child end device 106 also depends on the parent router 102 to receive and store all data packets addressed to the child device 106, as well as multicast messages from multicast addresses that the child end device 106 registered with the parent router 102, which may be received while the child end device 106 is sleeping. When the child end device 106 awakes, the stored data packets are forwarded to the child end device 106. The parent router 102 responding on behalf of the sleeping child end 106 device ensures that traffic for the child end device 106 is handled efficiently and reliably on the mesh network 100, as the parent router 102 responds to messages sent to the child end device 106, which enables the child end device to operate in a low-power mode for extended periods of time to conserve power.

Preferences for Prioritized Routing

Decisions to determine a route for a data packet in mesh networks may be based on a routing cost associated with each of the potential routes over which a data packet can be forwarded. For example, the routing cost may be based on one, or a combination of, characteristics of a route and the constituent hops in the route. For example routing costs may be determined based on a number of hops in a routing path, or a measure of link quality for hops in the route.

In cases where a data packet is routed to a destination in an external network, such as the Internet, there may be other factors to consider in making a decision between potential routes. Different external networks may have different financial costs, reliability, latency, bandwidth, security, and so forth, which may make one route preferable over another. However, routing costs may not fully describe the other factors useful in prioritizing the routing of a packet data over one external network relative to another.

For example, a packet can be forwarded over either a route using a Wi-Fi network connection, or a route using a cellular network connection. It may be preferable to prioritizing the Wi-Fi network route over the cellular network route, if the cost of using the Wi-Fi network is lower. In another example, if there is a wired network (e.g., Ethernet) route it may be prioritized over a wireless network route, if the wired network offers a better quality of service (QoS) guarantee than the wireless network.

Each provisioning domain in the network data is associated with an address prefix assigned by an external network. Each provisioning domain also includes the router preference value associated with the address prefix and the associated border router 202. The router preference value is used to compare preferences in order to prioritize candidate routes.

As an example and not a limitation, the preference may be set to values corresponding to a high preference, a medium preference, or a low preference. The value of any preference may be set by a user, based on any suitable criteria the user chooses for routing preferences. If no value is set for a preference, a default value may be set when the provisioning domain is populated. For example, the value for the preference may be set to a value representing a medium preference.

In an embodiment, the router 102 uses the route information in the provisioning domains along with mesh routing cost and next hop information in making forwarding decisions. If an IPv6 Destination Address is not an on-mesh address, then the router 102 uses the IPv6 Source Address to determine a set of the border routers 202 that offer routes associated with the same provisioning domain as the prefix of the IPv6 Source Address.

Within the set of border routers 202, the router 102 finds a longest External Route prefix match as follows:
1) If two address prefixes match, choose the address prefix with higher preference.
2) If no External Route matches, choose the border router 202 that offers a default route.
3) If more than one border router 202 offers a default route, choose the border router 202 with higher preference.
4) Finally, if two or more border routers 202 remain, choose the border router 202 with lowest mesh path cost.

If the IPv6 Destination Address is a Prefix-Based DHCPv6 Agent Anycast RLOC, then the router 102 uses a Context ID encoded in the Anycast address to determine the set of DHCPv6 Agents with the same provisioning domain as the prefix associated with the Context ID. Within that set, the router 102 finds the closest DHCPv6 Agent as follows:
1) If more than one DHCPv6 Agent offers a default route, choose the DHCPv6 Agent with higher preference value.
2) If two or more DHCPv6 Agents remain, choose the DHCPv6 Agent with lowest mesh path cost.

Duplicate Address Detection

Figure 5:
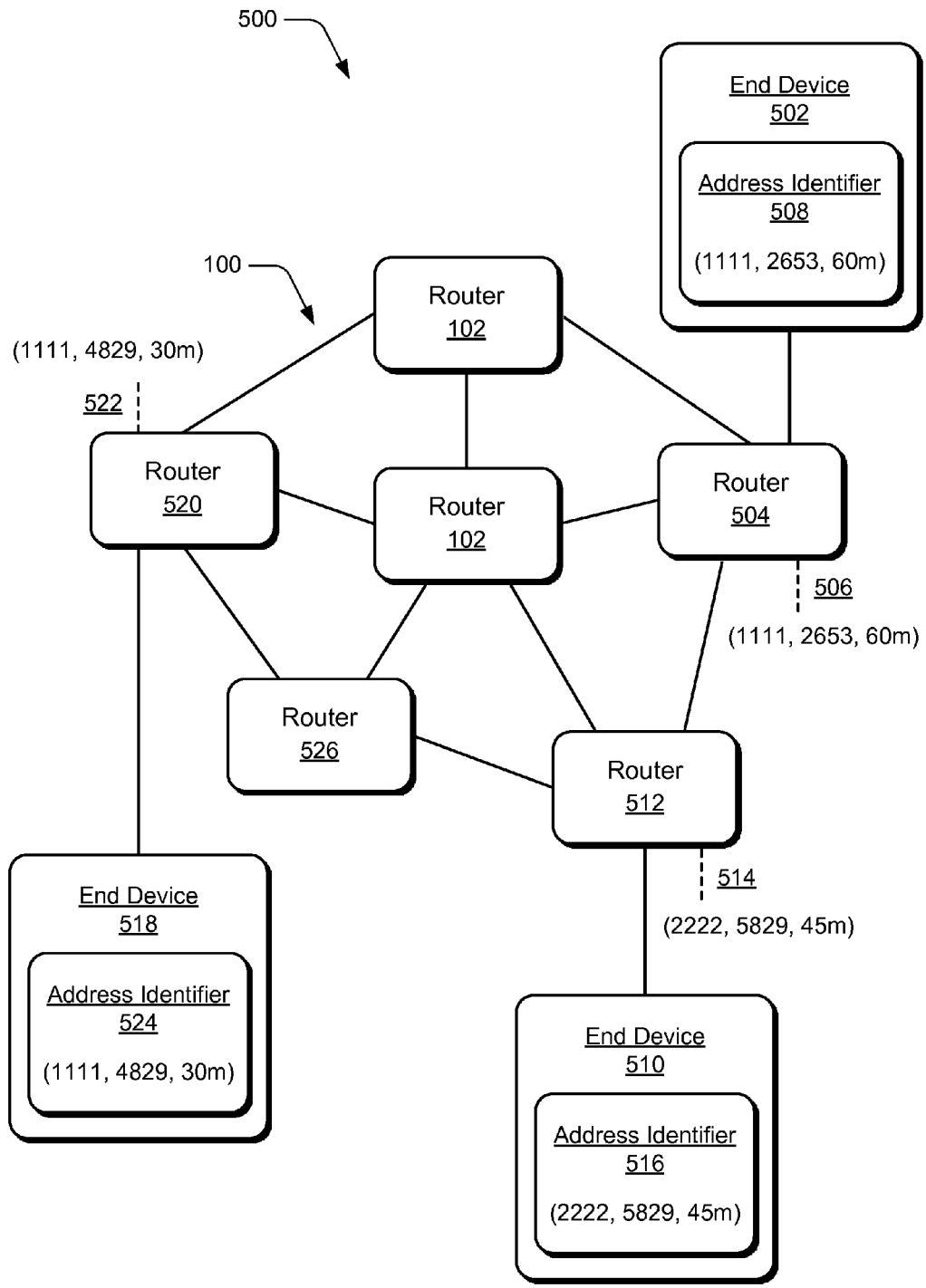
FIG. 5 illustrates an example mesh network system in which various embodiments of mesh network addressing as generally related to duplicate address detection can be implemented.

FIG. 5 illustrates an example mesh network system 500 in which various embodiments of mesh network addressing as generally related to duplicate address detection can be implemented. The example mesh network system 500 includes the mesh network 100 described with reference to FIGS. 1 and 2, and includes router devices 102 and end devices 106. Although some of the router devices are labeled with number identifiers other than 102 merely to distinguish the devices in the following discussion of the example mesh network system 500, any of the routers may be implemented as a router 102 described herein. Similarly, although the end devices are labeled with number identifiers other than 106 merely to distinguish the devices in the following discussion, any of the end devices may be implemented as an end device 106 described herein.

An end device 106 includes a mesh network interface for communication over the mesh network, such as via a router device 102 that can receive and transmit packet data over the mesh network interface, and route traffic across the mesh network 100. Further, an end device (also referred to as a leaf node or edge device of the mesh network) can communicate over the mesh network 100 by forwarding data to its associated router device 102, which then routes the data across the mesh network. Generally, the mesh network devices, and in particular the end devices, randomly select or generate an IP address on the mesh network, such as for privacy reasons. However, one or more of the mesh network devices may select or generate the same address, which promotes the need to check for duplicate addresses generated by more than one of the mesh network devices.

When an end device 106 attaches to a router device 102 in the mesh network 100 (e.g., the end device is communicatively coupled to the router device for wireless communication in the mesh network), the end device will store a device state in the router that attaches the end device in the mesh network. For example, the stored device state is a tuple state (e.g., a tuple being an ordered list of elements) that includes an address, a random value, and a lifetime. The address is selected or generated by the end device, the random value is generated by the end device, and the lifetime indicates how long the router will maintain the state for the attached end device. For example, an end device 502 is attached to a router 504 in the mesh network 100, and the end device generates an address 1111 and a random value 2653 with a lifetime of sixty minutes (60 m). The router 504 maintains a tuple state 506 of the end device 502 for the designated lifetime of sixty minutes (60 m). Note that the end device 502 maintains its own state as an address identifier 508 of the end device. As described in more detail below, the random value can be used by a mesh network device (e.g., an end device or a router device) to test the uniqueness of a device address in the mesh network.

Similar to the end device 502, an end device 510 is attached to a router 512 in the mesh network 100, and the end device 510 generates an address 2222 and a random value 5829 with a lifetime of forty-five minutes (45 m). The router 512 maintains the tuple state 514 of the end device 510 for the designated lifetime, or remaining lifetime, and the end device 510 maintains its own state as an address identifier 516 of the end device. Similarly, an end device 518 is attached to a router 520 in the mesh network 100, and the end device 518 generates an address 1111 and a random value 4829 with a lifetime of thirty minutes (30 m). The router 520 maintains the tuple state 522 of the end device 518 for the designated lifetime, or remaining lifetime, and the end device 518 maintains its own state as an address identifier 524 of the end device. In this example, the lifetimes of the respective end devices are represented in minutes, but may be designated as any other time duration, such as seconds, hours, days, etc. In other scenarios, the end device 518 may have been attached to the router 520 with a lifetime of sixty minutes (60 m) (i.e., thirty minutes previous to the current state of the mesh network at thirty minutes). Similarly, the end device 510 may have been attached to the router 512 with a lifetime of sixty minutes (60 m) (i.e., fifteen minutes previous to the current state of the mesh network at forty-five minutes).

In implementations of the mesh network 100, the router devices 102 may have limited memory, and the end devices 106 may attach to different ones of the router devices at various times. For example, FIG. 6 continues the example of duplicate address detection when the end device 518 moves from the router device 520 and attaches to a router device 526. Given the lifetime to maintain the address identifier of an end device, a router device is able to reclaim memory that would otherwise store an address identifier of an end device that has attached to a different router device. As an end device moves around and attaches to different ones of the router devices, it leaves behind the address identifier as the stored tuple state at previous routers for the corresponding designated lifetime.

Figure 6:
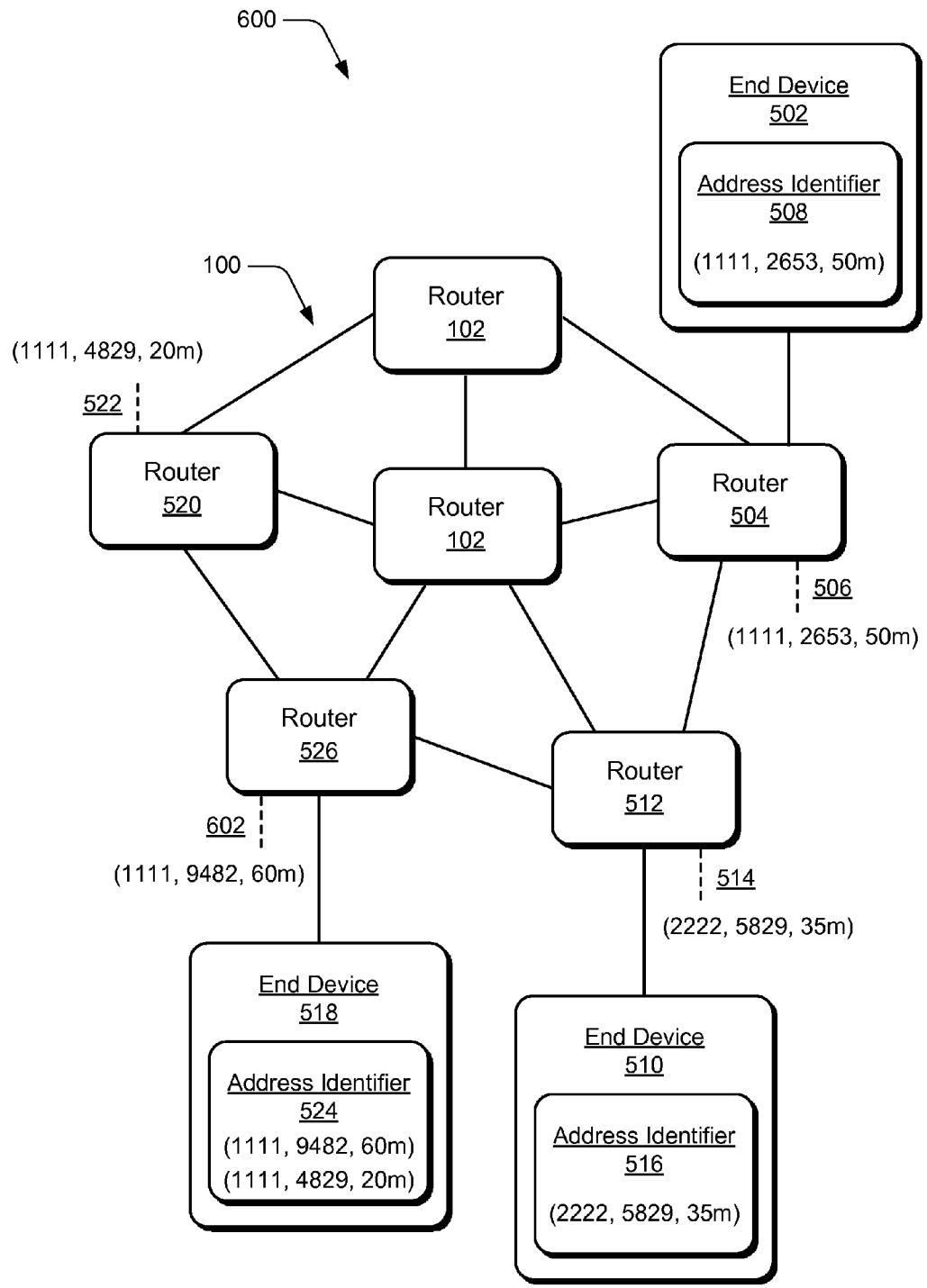
FIG. 6 further illustrates the example of duplicate address detection in the example mesh network system in accordance with various embodiments of mesh network addressing.

FIG. 6 further illustrates the example of duplicate address detection in the example mesh network system 500 in accordance with various embodiments of mesh network addressing. In this example 600, the end device 518 has moved from the router device 520 (e.g., as shown in FIG. 5) and has attached to the router device 526 in the mesh network 100. The end device 518 still has the address 1111 and generates a new random value 9482 with a lifetime of sixty minutes (60 m). The router 526 maintains the new tuple state 602 of the end device 518 for the designated lifetime of sixty minutes (60 m). Note that the end device 518 maintains its own state as the address identifier 518, which has been updated to include both the previous tuple state 522 that is maintained by the router 520 and the new tuple state 602 that is maintained by the router 526. Also note that the lifetime designations for all of the end devices have all been decremented by ten minutes to indicate that the end device 518 moved and attached to the different router 526 ten minutes after the previous state of the mesh network when the end device 518 was attached to the router 520.

The end device 518 can initiate a multicast address query to all of the other mesh network devices in the mesh network 100, requesting that any of the other mesh network devices with the same address respond back with the corresponding tuple state that is stored for that same address. For example, the end device 518 can initiate a multicast address query in the mesh network 100, requesting that any of the other mesh network devices with the same address 1111 respond back with the corresponding stored tuple state at an associated router device. The same address of 1111 alone does not provide enough information to detect a duplicate address in the mesh network. However, the combination of the address and the random number provides a basis for detecting a duplicate address of a mesh network device in the mesh network.

For example, in response to the multicast address query that is initiated by the end device 518, the end device will receive back the (1111, 4829, 20 m) tuple state 522 from the router 520 (e.g., that the end device 518 was previously attached to); the (1111, 9482, 60 m) tuple state 602 from the router 526 (e.g., that the end device 518 is currently attached to); and the (1111, 2653, 50 m) tuple state 506 from the router 504. Although the (1111, 4829, 20 m) tuple state 522 indicates a duplicate address 1111 at a router device other than the one that the end device 518 is currently attached to, the end device 518 can determine that the duplicate was previously generated by the end device 518 itself based on the end device maintaining its own states as the address identifier 524. Similarly, the (1111, 2653, 50 m) tuple state 506 from the router 504 indicates a duplicate address 1111 with the end device 502, which is detected by the end device 518 as a duplicate address because the random value 2653 does not match any of the random values (e.g., 4829 and 9482) that have been generated and stored by the end device.

This is an example of first-party duplicate address detection because the end device 518 is initiating the address query to determine if any of the other mesh network devices have an address that is a duplicate of the end device address. In a similar technique, third-party duplicate address detection can be initiated by some other mesh network device in the mesh network 100 that wants to determine whether there is one or more duplicate addresses of the mesh network devices. Third-party duplicate address detection is described with reference to FIGS. 5 and 7.

When the end device 518, or some other mesh network device, detects a duplicate address in the mesh network 100, the end device can direct the mesh network devices that have the duplicate address to generate a new address. In implementations, an end device or router device can detect the possibility of a duplicate address and multicast an address error notification to notify the other mesh network devices of the detected duplicate address. Further, a parent device (e.g., of an end device) that receives a multicast address error notification can check to determine whether any of its network device children is the target of the address error notification, and send a unicast message so that sleepy children can get the notification as well.

In embodiments of duplicate address detection, the mesh network 100 can be implemented with a form of optimistic duplicate address detection, where IPv6 addresses may be assigned and used before any attempt to detect and resolve duplicates takes place. The ML-EID is used to uniquely identify the mesh network devices with high probability, since those are randomly chosen by a given device. Although a device's IEEE 802.15.4 extended address may be used, the ML-EID is utilized because those are always encrypted when transmitted over the air. The 802.15.4 extended addresses are sent in the clear as part of the 802.15.4 header, so a device may change its extended address to preserve privacy. Address notification messages can be used to detect duplicate EIDs. The mesh network devices can receive address notification messages in response to address queries or asynchronously in the case of proactive address notifications. The mesh network devices perform duplicate detection in both scenarios.

When the same EID is assigned to two or more mesh network devices in the same mesh network partition, an address query generates multiple address notification messages. The receiver of the address notification messages compares the ML-EID TLVs of the received address notification messages to determine whether or not the multiple replies are due to multiple interfaces using the same IPv6 address or a single interface migrating from router device to router device. If two or more received address notification messages have the same EID, but different ML-EIDs, then the receiving device can determine that the EID is in use by more than one device and multicasts an address error notification message to a realm-local all-routers multicast address (FF03::2).

A mesh network device that receives a proactive address notification message compares the RLOC16 of the address notification message to the RLOC16 contained in its EID-to-RLOC map cache. If an EID-to-RLOC map cache entry exists for the EID and the RLOC16 differs, then the mesh network device can determine that the EID may be in use by more than one device and unicasts an address error notification to the RLOC16 contained in the EID-to-RLOC map cache entry, and then updates the EID-to-RLOC map cache entry with the newly received RLOC16. This unicast message serves to check whether the old RLOC is truly a duplicate user of the EID or simply stale data.

The receiver of a unicast address error notification message can determine whether the target EID belongs to itself or, in the case of a router device, belongs to one of its children, and compares the ML-EID associated with the target EID in its local state and the ML-EID in the address error notification message. If the ML-EIDs differ, then the mesh network device can determine that the target EID is in use by more than one device and multicasts an address error notification message to the realm-local all-routers multicast group (FF03::2).

A mesh network device can send address error notification messages to notify other mesh network devices that a duplicate EID may be in use. In implementations, the address error notification messages are CoAP POST messages containing the detected duplicate IPv6 address and the ML-EID contained in the Address Notification that triggered the duplicate address detection: URI-Path; NON POST coap://[<peer address>]:MM/a/ae; CoAP Payload; Target EID TLV; and ML-EID TLV. The IPv6 source address is the RLOC of the originator device, and the IPv6 destination address is either the realm-local all-routers multicast address (FF03::2) when sent via multicast, or the RLOC of the destination device when sent via unicast. The Target EID TLV and the ML-EID TLV are copied from the address notification or address error notification message that triggered the message.

When a mesh network device receives an address error notification message, the mesh network device can check whether the target EID is assigned to its mesh network interface. If the target EID is assigned to its mesh network interface and the ML-EID differs, then a duplicate is detected and the device stops using the target EID. If the recipient device of an address error notification is a router device, then the device checks whether the target EID is assigned to one of its RFD child's mesh network interfaces. If the target EID is assigned to an RFD child's mesh network interface and the ML-EID differs, then a duplicate is detected and the router device unicasts an address error notification to the corresponding RFD child (e.g., an end device) and the router device removes the target EID from the RFD child address set. If the recipient device of a unicast address error notification is not an RFD, then the mesh network device multicasts an address error notification to the realm-local all-routers multicast address (FF03::2).

Figure 7:
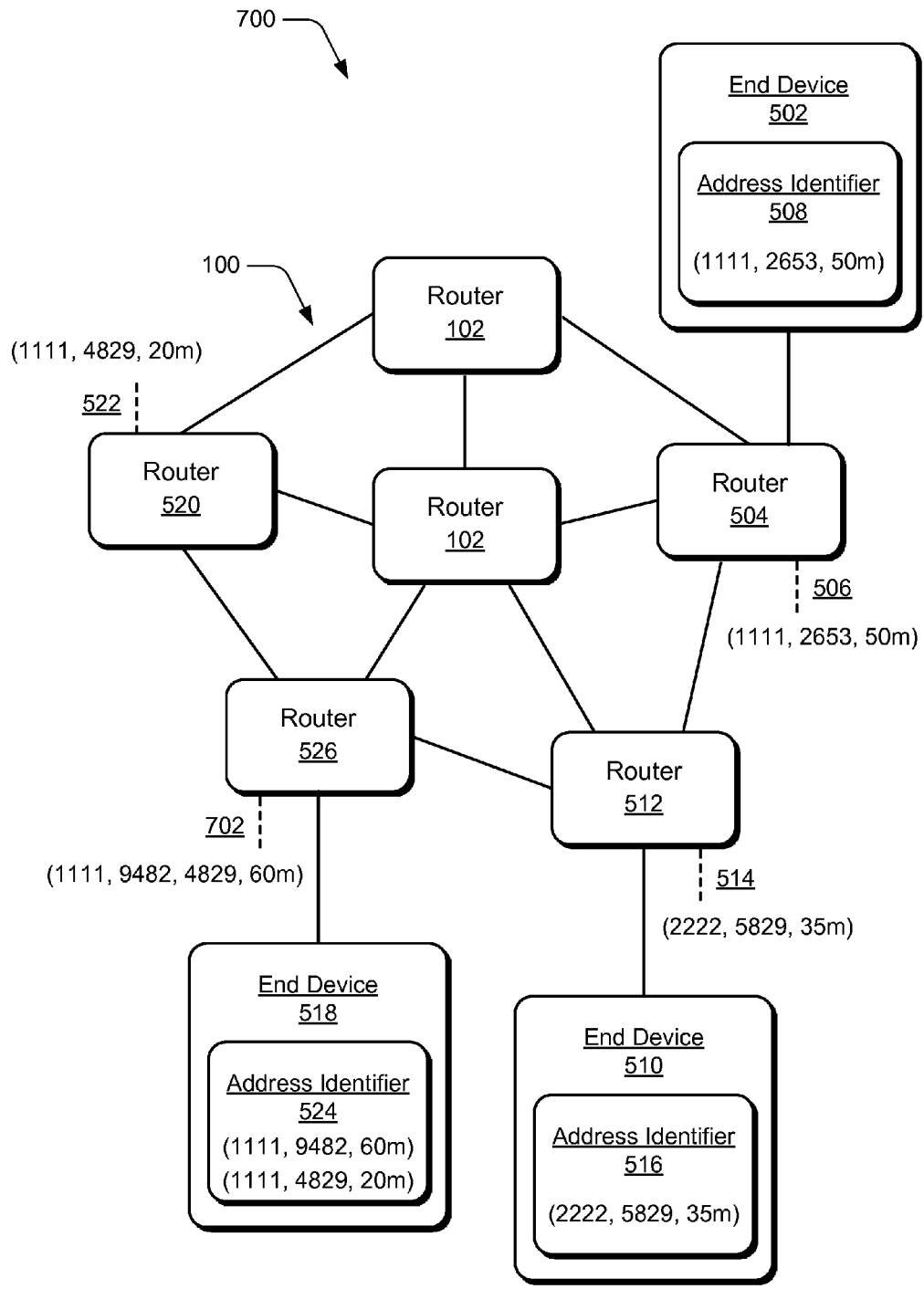
FIG. 7 further illustrates the example of duplicate address detection in the example mesh network system in accordance with various embodiments of mesh network addressing.

FIG. 7 further illustrates the example of duplicate address detection in the example mesh network system 500 in accordance with various embodiments of mesh network addressing. In this example 700, the end device 518 has moved from the router device 520 (e.g., as shown in FIG. 5) and has attached to the router device 526 in the mesh network 100. The end device 518 still has the address 1111 and generates a new random value 9482 with a designated lifetime of sixty minutes (60 m). The router 526 maintains the new tuple state 702 of the end device 518 for the designated lifetime of sixty minutes (60 m).

In this example 700, the tuple state 702 includes an address, one or more previous random values, the current random value, and a lifetime. This format of the tuple state 702 provides a trace of where the end device 518 has been (e.g., a trace of which routers the end device has been attached to). For example, the end device 518 that moves from the router 520 and is attached to the router 526 in the mesh network 100 has the address 1111 and generates the new random value 9482 with a lifetime of sixty minutes (60 m). The router 526 maintains (1111, 9482, 4829, 60 m) as the tuple state 702 of the end device 518 for the designated lifetime. The format of the tuple state 702 including the one or more previous random values provides that an end device can be detected as it moves and attaches to various router devices, versus an end device that is attached to two router devices. The end device 518 also maintains its own state as the address identifier 524, and the address identifier for the end device 518 includes both the previous tuple state 522 and the new tuple state 702.

Another of the mesh network devices, such as either of the router devices 102 in the mesh network 100, can initiate a multicast address query to all of the other mesh network devices, requesting that any of the other mesh network devices with a designated address respond back with the corresponding tuple state that is stored for that same address. For example, a router device 102 can initiate a multicast address query in the mesh network 100, requesting that any of the other mesh network devices with the address 1111 respond back with the corresponding stored tuple state. In response to the multicast address query, the router device will receive back the (1111, 4829, 20 m) tuple state 522 from the router 520 (e.g., that the end device 518 was previously attached to); the (1111, 9482, 4829, 60 m) tuple state 702 from the router 526 (e.g., that the end device is currently attached to); and the (1111, 2653, 50 m) tuple state 506 from the router 504.

Although the random value of 4829 in the (1111, 4829, 20 m) tuple state 522 is contained in the (1111, 9482, 4829, 60 m) tuple state 702, the router 102 can determine that the (1111, 4829, 20 m) tuple state 522 and the (1111, 9482, 4829, 60 m) tuple state 702 are generated by the same mesh network device (e.g., the end device 518 in this example). However, the random value of 2653 in the (1111, 2653, 50 m) tuple state 506 does not occur in either of the (1111, 4829, 20 m) tuple state 522 or the (1111, 9482, 4829, 60 m) tuple state 702, and the router device detects a duplicate address.

A benefit of third-party duplicate address detection is that an always-on router (e.g., a router device 102) may test the uniqueness of an address without involving a battery-powered end device, unlike in the first-party duplicate address detection scenario described with reference to FIGS. 5 and 6 where the end device 518 is powered to initiate the multicast address query, receive the responses, and process the responses. An optimization of the techniques for duplicate address detection includes using the lifetime value of a tuple state to encode the random value and reduce the need to maintain random values by the associated router device (e.g., due to limited available memory at the router devices). Additionally, the k-most recent random values can be maintained to handle network partitions and/or message drops.

Figure 8:
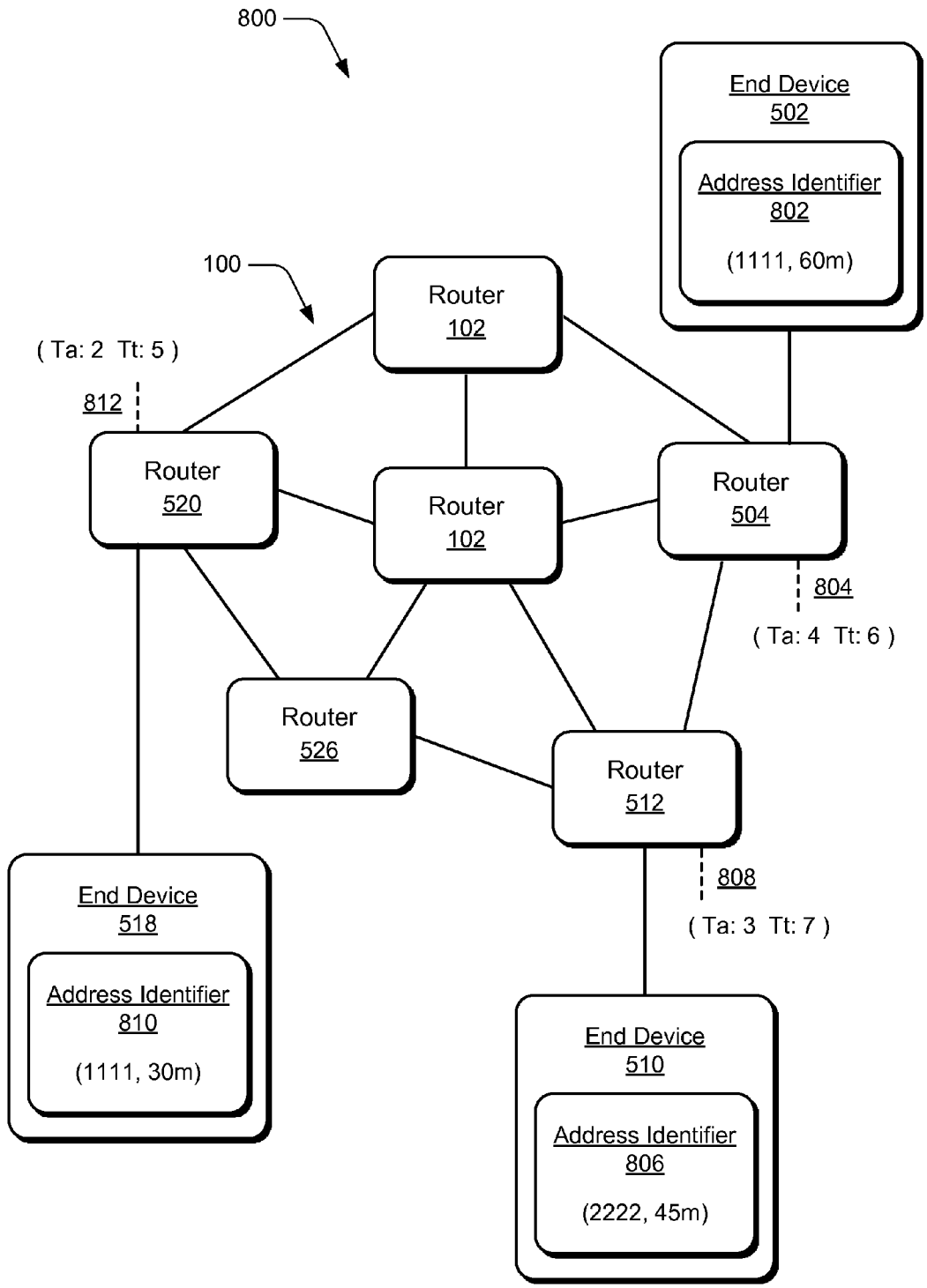
FIG. 8 further illustrates the example of duplicate address detection in the example mesh network system in accordance with various embodiments of mesh network addressing.

FIG. 8 illustrates an example 800 of duplicate address detection in the example mesh network system 500 in accordance with various embodiments of mesh network addressing. In this example 800, when an end device 106 attaches to a router device 102 in the mesh network 100 (e.g., the end device is communicatively coupled to the router device for wireless communication in the mesh network), the end device will store a device state in the router that attaches the end device in the mesh network. For example, the stored device state is time-based information that includes a time attached ("Ta") when an end device 106 attaches to a router device 102, and includes a last transaction time ("Tt") when an end device 106 last communicates with the attached router device 102.

For example, the end device 502 is attached to the router 504 in the mesh network 100, and the end device generates an address 1111 with a lifetime of sixty minutes (60 m). The end device 502 maintains its own state as an address identifier 802 of the end device. The router 504 maintains the time-based information 804 that indicates the end device 502 attached to the router 504 at time Ta: 4, and the end device 502 last communicated a transaction with the router 504 at time Tt: 6. In this example, the indicated attach times and transaction times, such as the attach time Ta: 4 and the last transaction time Tt: 6, are simply indicated as whole numbers that may represent any one or combination of seconds, minutes, hours, days, and/or other time duration.

Figure 9:
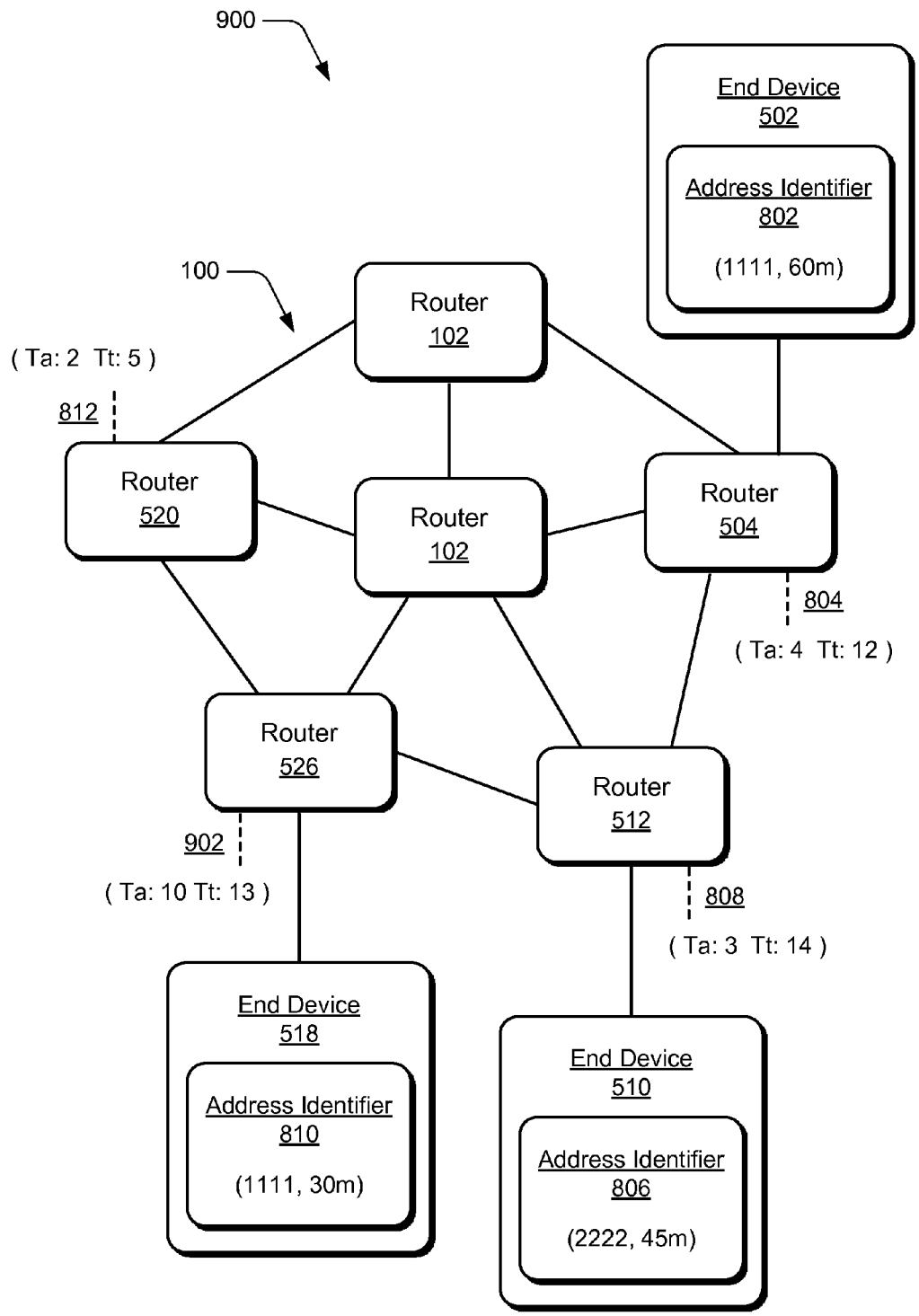
FIG. 9 further illustrates the example of duplicate address detection in the example mesh network system in accordance with various embodiments of mesh network addressing.

Similar to the end device 502, the end device 510 is attached to the router 512 in the mesh network 100, and the end device generates an address 2222 with a lifetime of forty-five minutes (45 m). The end device 510 maintains its own state as an address identifier 806 of the end device. The router 512 maintains the time-based information 808 that indicates the end device 510 attached to the router 512 at time Ta: 3, and the end device 510 last communicated a transaction with the router 512 at time Tt: 7. Similarly, the end device 518 is attached to the router 520 in the mesh network 100, and the end device generates an address 1111 with a lifetime of thirty minutes (30 m). The end device 518 maintains its own state as an address identifier 810 of the end device. The router 520 maintains the time-based information 812 that indicates the end device 518 attached to the router 520 at time Ta: 2, and the end device 518 last communicated a transaction with the router 520 at time Tt: 5. FIG. 9 continues the example of duplicate address detection when the end device 518 moves from the router device 520 and attaches to the router device 526.

FIG. 9 further illustrates the example of duplicate address detection in the example mesh network system 500 in accordance with various embodiments of mesh network addressing, as described with reference to FIG. 8. In this example 900, the end device 518 has moved from the router device 520 (e.g., as shown in FIG. 8) and has attached to the router device 526 in the mesh network 100. The end device 518 still has the address 1111 with a lifetime of 30 minutes (30 m). The router 526 maintains new time-based information 902 that indicates the end device 518 attached to the router 526 at time Ta: 10, and the end device 518 last communicated a transaction with the router 526 at time Tt: 13. Note that the indicated transaction times for all of the end devices have all been updated based on the last communicated transactions with the respective router devices.

The end device 518 can initiate a multicast address query to all of the other mesh network devices in the mesh network 100, requesting that any of the other mesh network devices with the same address respond back with the corresponding time-based information that is stored for that same address. For example, the end device 518 can initiate a multicast address query in the mesh network 100, requesting that any of the other mesh network devices with the same address 1111 respond back with the corresponding stored time-based information at an associated router device. The same address of 1111 alone does not provide enough information to detect a duplicate address in the mesh network. However, the time-based information, or the combination of the address and the time-based information, provides a basis for detecting a duplicate address of a mesh network device in the mesh network.

For example, in response to the multicast address query that is initiated by the end device 518, the end device will receive back the (Ta: 2, Tt: 5) time-based information 812 from the router 520 (e.g., that the end device 518 was previously attached to); the (Ta: 10, Tt: 13) time-based information 902 from the router 526 (e.g., that the end device 518 is currently attached to); and the (Ta: 4, Tt: 12) time-based information 804 from the router 504. A duplicate address of a mesh network device can be detected based on overlapping time durations between the attach time Ta of an end device and the last transaction time Tt when the end device communicates a transaction with the attached router device. For example, the (Ta: 4, Tt: 12) time-based information 804 that corresponds to the end device 502 (having the address of 1111) overlaps both the (Ta: 2, Tt: 5) time-based information 812 and the (Ta: 10, Tt: 13) time-based information 902 that corresponds to the end device 518 (also having the address of 1111). Accordingly, the end device 518 can detect the time-based information overlap as a mesh network device having a duplicate address.

This is an example of first-party duplicate address detection because the end device 518 is initiating the address query to determine if any of the other mesh network devices have an address that is a duplicate of the end device address. In a similar technique as describe above, third-party duplicate address detection can be initiated by some other mesh network device in the mesh network 100, such as any of the router devices 102, that wants to determine whether there is one or more duplicate addresses of the mesh network devices.

Example methods 1000 through 1400 are described with reference to respective FIGS. 10-14 in accordance with one or more embodiments of mesh network addressing. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
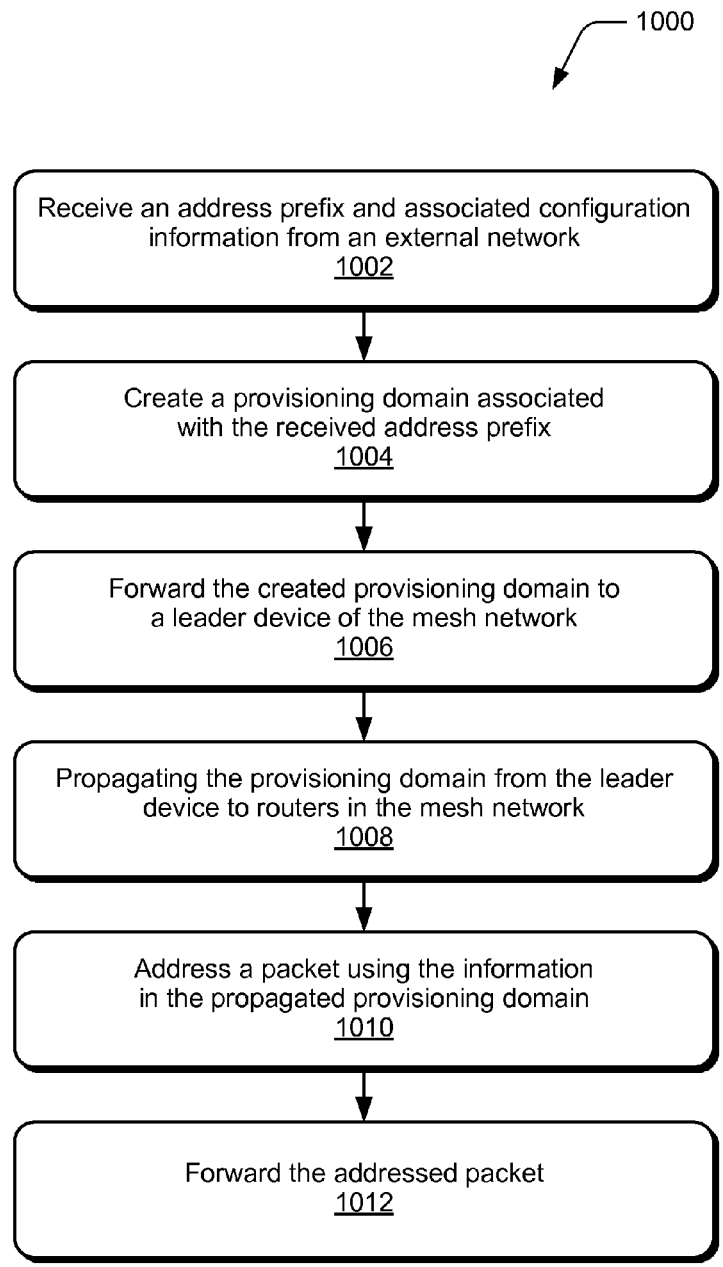
FIG. 10 illustrates an example method of mesh network addressing as generally related to provisioning domains in a mesh network in accordance with embodiments of the techniques described herein.

FIG. 10 illustrates example method(s) 1000 of mesh network addressing as generally related to addressing and routing packets in a mesh network. The order in which the method blocks are described are not intended to be construed as a limitation, and any number of the described method blocks can be combined in any order to implement a method, or an alternate method.

At block 1002, an address prefix and associated configuration information is received from an external network and, at block 1004, a provisioning domain is created and associated with the received address prefix. For example, a border router 202 receives an address prefix and associated network configuration information, such as the configuration data 402 or 404, from an external network, such as the external networks 302 or 304, respectively. The border router 202 creates a provisioning domain that includes the received address prefix and the associated configuration information, along with a unique identifier for the provisioning domain.

At block 1006, the created provisioning domain is forwarded to a leader device of the mesh network 100. At block 1008, the provisioning domain is propagated from the leader to the mesh network 100. For example, the border router 202 forwards the created provisioning domain over the mesh network 100 to a leader device 210, which is effective to enable the leader device 210 to store the provisioning domain. The leader device 210 propagates the received provisioning domain to the routers 102 and the router-eligible end devices 104 in the mesh network 100. Alternatively, the border router 202 forwards the configuration data 402 or 404 to a leader device 210, which creates the provisioning domain and assigns the unique identifier to the provisioning domain, before propagating the provisioning domain to the mesh network 100.

At block 1010, a packet is addressed using the information in the propagated provisioning domain. At block 1012, the addressed packet is forwarded over the mesh network. For example, a router 102 determines, for a destination of a data packet (e.g., from an RLOC lookup), to use the address prefix in the provisioning domain to form a Destination Address for the data packet. The router 102 forwards the data packet on a route using the Destination Address.

Figure 11:
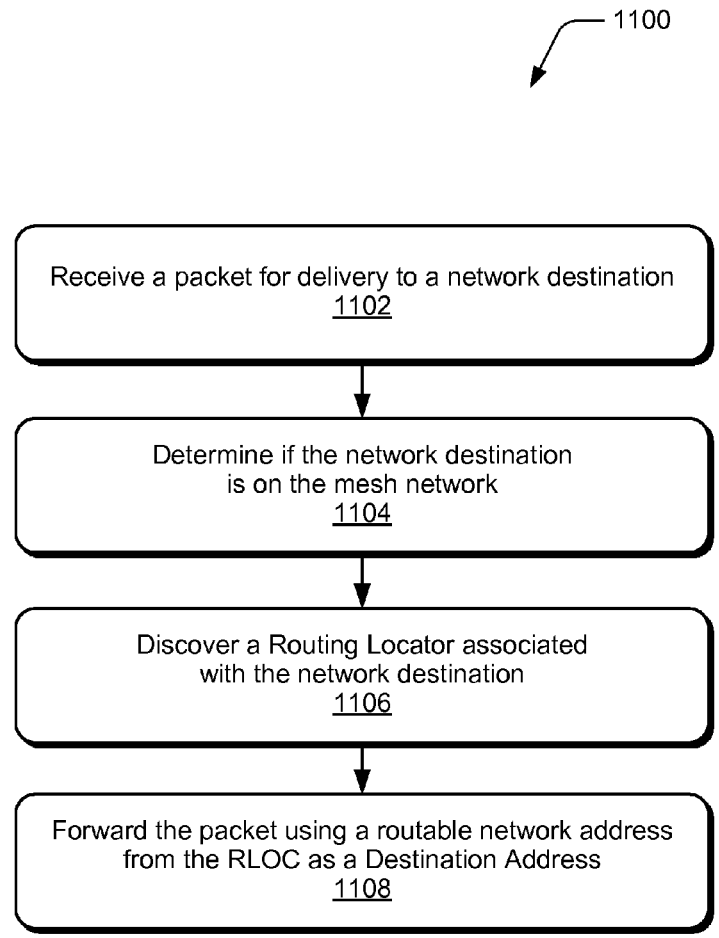
FIG. 11 illustrates another example method of mesh network addressing as generally related to addressing architecture in a mesh network in accordance with embodiments of the techniques described herein.

FIG. 11 illustrates example method(s) 1100 of mesh network addressing as generally related to addressing and routing packets in a mesh network. The order in which the method blocks are described are not intended to be construed as a limitation, and any number of the described method blocks can be combined in any order to implement a method, or an alternate method.

At block 1102, packet is received for delivery to a network destination. At block 1104, it is determined if the network destination is on the mesh network. For example, a router 102 receives a packet (e.g., from an application executing on the router 102 or from a child end device 106 of the router 102) to deliver to a network destination. The router 102 determines that the network destination is on the mesh network, such as the network destination being an Endpoint Identifier (EID) that indicates that the network destination is on the mesh network, but is not a routable address.

At block 1106, a Routing Locator (RLOC) associated with the network destination is discovered. At 1108, the packet is forwarded using a routable network address, from the RLOC, as a Destination Address. For example, the router 102 discovers an RLOC for the EID, such as by an RLOC lookup of RLOCs cached in the router 102 or by performing an address query. The router 102 uses the routable network address, which is mapped from the EID in the RLOC, to form a Destination Address (such as an IPv6 Destination Address) for the packet. The router 102 forwards the packet on the mesh network 100 based on the Destination Address.

Figure 12:
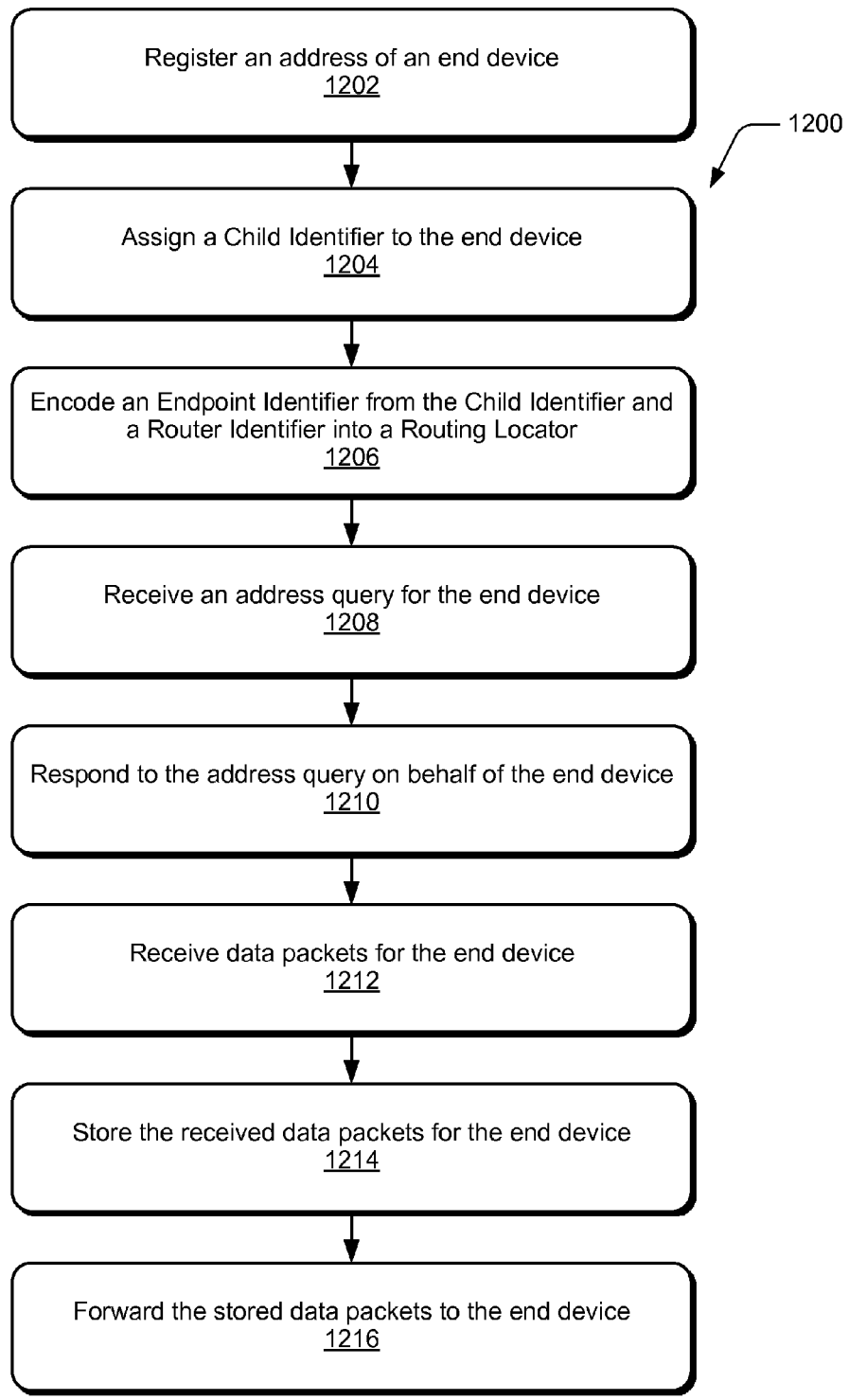
FIG. 12 illustrates an example method of mesh network addressing as generally related to end devices in a mesh network in accordance with embodiments of the techniques described herein.

FIG. 12 illustrates example method(s) 1200 of mesh network addressing as generally related to addressing and routing for end devices in a mesh network. The order in which the method blocks are described are not intended to be construed as a limitation, and any number of the described method blocks can be combined in any order to implement a method, or an alternate method.

At block 1202, an address of an end device is registered. At 1204, a Child Identifier is assigned to the end device. At block 1206, and Endpoint Identifier (EID) is encoded from the Child Identifier and a Router Identifier into a Routing Locator (RLOC). For example, an address for a child end device 106 is registered at a parent router 102. The parent router 102 assigns a Child Identifier to the child end device 106. The parent router 102 encodes the Child Identifier and a Router Identifier of the parent router 102 into a Routing Locator for the child end device.

At block 1208, an address query for the end device is received. At 1210, a response to the address query is made on behalf of the end device. For example, the parent router 102 receives an address query over the mesh network 100 that includes the encoded EID for the child end device 106. The parent router 102 responds to the address query, on behalf of the child end device, with the RLOC for the child end device.

At block 1212, data packets for the end device are received, at 1214, the received data packets for the end device are stored, and at 1216, the stored data packets are forwarded to the end device. For example, the parent router 102 receives, on behalf of the child end device 106, data packets that are addressed to the child end device 106. Receiving the data packets on behalf of the child end device 106 may include performing any networking protocols, such as acknowledging the received data packets, assembling the received data packets into a message, requesting retransmission of missing packets, and the like. The parent router 102 stores the received data packets, such as during the period of time that the child end device 106 sleeps. The parent router 102 forwards the stored data packets to the child end device 106, such as when the child end device 106 ends a period of sleep and reestablishes mesh network communication with the parent router 102.

Figure 13:
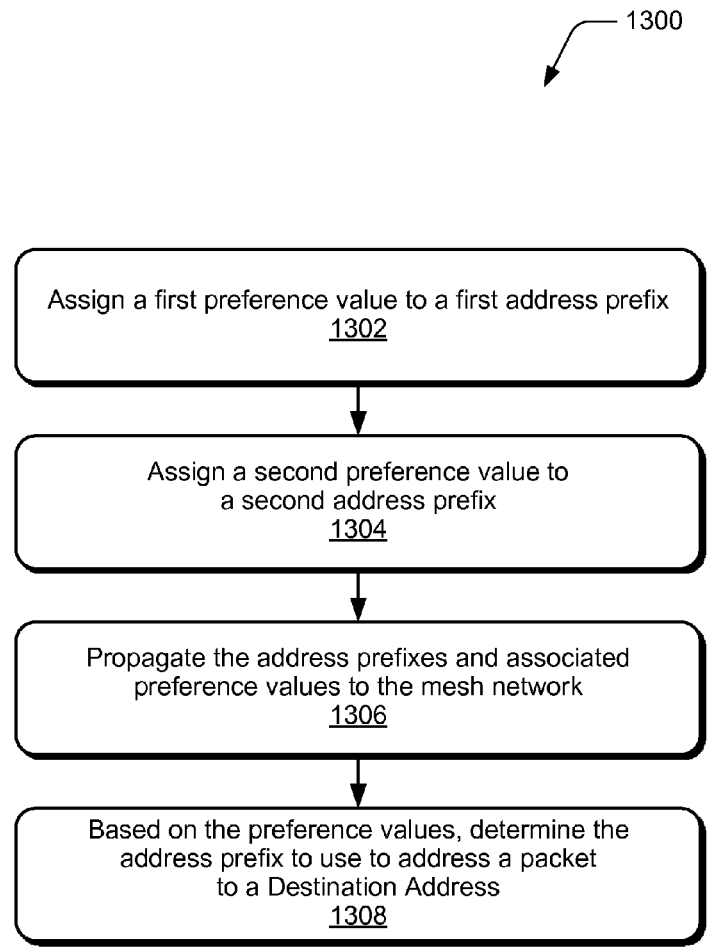
FIG. 13 illustrates another example method of mesh network addressing as generally related to prioritized routing in a mesh network in accordance with embodiments of the techniques described herein.

FIG. 13 illustrates example method(s) 1300 of mesh network addressing as generally related to address-based prioritizing of routing in a mesh network. The order in which the method blocks are described are not intended to be construed as a limitation, and any number of the described method blocks can be combined in any order to implement a method, or an alternate method.

At block 1302, a first preference value is assigned to a first address prefix. At block 1304, a second preference value is assigned to a second address prefix. For example, a first preference value is assigned in a first provisioning domain for a first address prefix. A second preference value is assigned in a second provisioning domain for a second address prefix. The preference values may be set in any suitable manner, such as by a network administrator, using default values, and the like.

At block 1306, the address prefixes and associated preference values are propagated to the mesh network. For example, a leader device 210 of the mesh network 100 propagates the first provisioning domain and the second provisioning domain, as a part of network data, to the routers 102 and the router-eligible devices 104 in the mesh network 100.

At 1308, based on the preference values, determine an address prefix to use to address a packet to a destination address. For example, a router 102 uses the first and second preference values in the propagated provisioning domains to determine whether to use the first address prefix or the second address prefix for the Destination Address (e.g., IPv6 Destination Address), to address and forward the packet over the mesh network 100.

Figure 14:
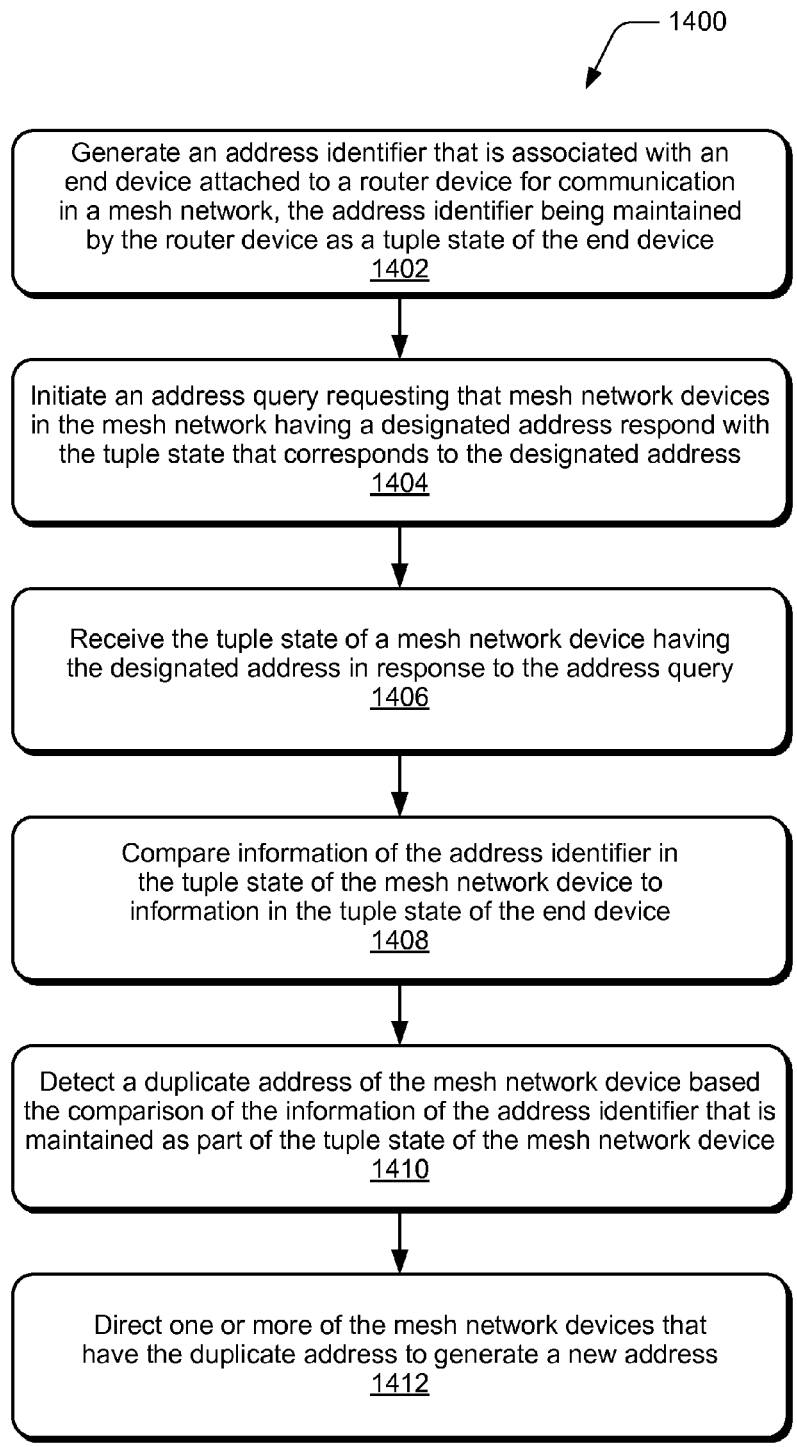
FIG. 14 illustrates an example method of mesh network addressing as generally related to duplicate address detection in a mesh network in accordance with embodiments of the techniques described herein.

FIG. 14 illustrates example method(s) 1400 of mesh network addressing as generally related to duplicate address detection in a mesh network. The order in which the method blocks are described are not intended to be construed as a limitation, and any number of the described method blocks can be combined in any order to implement a method, or an alternate method.

At block 1402, an address identifier is generated, where the address identifier is associated with an end device attached to a router device for communication in a mesh network, the address identifier being maintained by the router device as a tuple state of the end device. For example, an end device 518 generates an address identifier when the end device 106 attaches to a router device 102 in the mesh network 100 (e.g., the end device is communicatively coupled to the router device for wireless communication in the mesh network). The end device stores a device state in the router that attaches the end device in the mesh network. In implementations, the stored device state is a tuple state (e.g., a list of elements) that includes an address, a random value, and a lifetime. The address is selected or generated by the end device, the random value is generated by the end device, and the lifetime indicates how long the router will maintain the state for the attached end device. In other implementations, the address identifier includes an address and time-based information associated with the end device. The time-based information includes a time attached ("Ta") when an end device 106 attaches to a router device 102, and includes a last transaction time ("Tt") when an end device 106 last communicates with the attached router device 102.

At block 1404, an address query is initiated requesting that mesh network devices in the mesh network having a designated address respond with the tuple state that corresponds to the designated address. For example, an end device or a router device initiates a multicast address query to all of the other mesh network devices in the mesh network 100, requesting that any of the other mesh network devices with the same address respond back with the corresponding tuple state that is stored for that same address. In other implementations, an end device or a router device initiates a multicast address query to all of the other mesh network devices in the mesh network 100, requesting that any of the other mesh network devices with the same address respond back with the corresponding time-based information that is stored for that same address.

At block 1406, the tuple state of a mesh network device having the designated address is received in response to the address query. For example, the end device or the router device receives back the tuple states that correspond to the other mesh network devices (e.g., the other end devices) that have the same designated address. In other implementations, the end device or the router device receives back the time-based information that corresponds to the other mesh network devices (e.g., the other end devices) that have the same designated address.

At block 1408, information of the address identifier in the tuple state of the mesh network device is compared to information in the tuple state of the end device. For example, the end device or the router device compares the address identifier information for the end device with the address identifier information of other mesh network devices having the same address to determine duplicate device addresses. Alternatively, the end device or router device compares the time-based information in the tuple state of other mesh network devices to the time-based information in the tuple state of the end device to detect a duplicate address of the mesh network device.

At block 1410, a duplicate address of the mesh network device is detected based the comparison of the information of the address identifier that is maintained as part of the tuple state of the mesh network device. For example, the end device or the router device that initiates the multicast address query detects a duplicate address of a mesh network device based on the random value that is maintained as part of the tuple state of the mesh network device, or in other implementations, based on the time-based information that corresponds to the mesh network device.

At block 1412, one or more of the mesh network devices that have the duplicate address are directed to generate a new address. For example, the end device or the router device that detects the duplicate address directs one or more of the mesh network devices that have the duplicate address to generate a new address.

Figure 15:
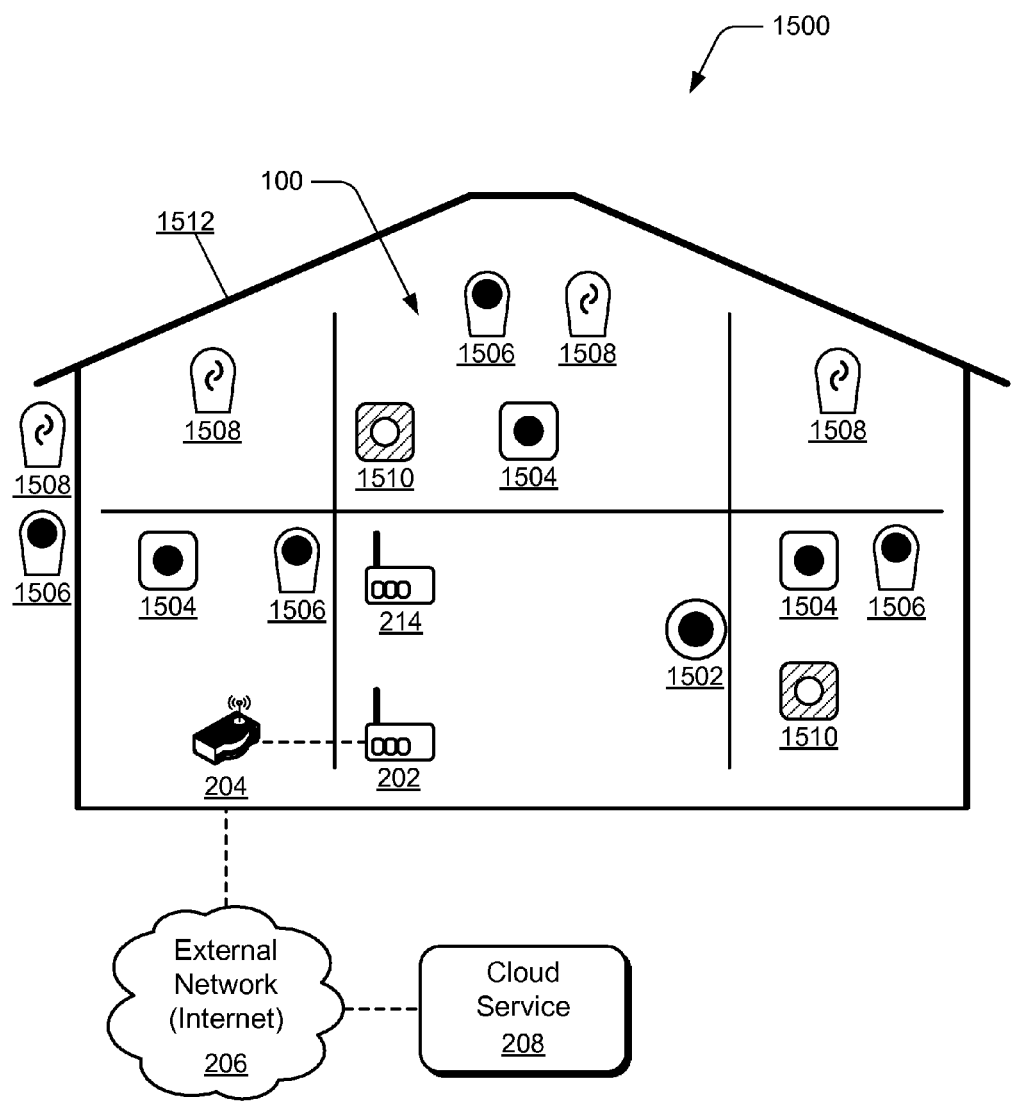
FIG. 15 illustrates an example environment in which a mesh network can be implemented in accordance with embodiments of the techniques described herein.

FIG. 15 illustrates an example environment 1500 in which the mesh network 100 (as described with reference to FIG. 1), and embodiments of mesh network addressing can be implemented. Generally, the environment 1500 includes the mesh network 100 implemented as part of a smart-home or other type of structure with any number and type of mesh network devices that are configured for communication in a mesh network. For example, the mesh network devices can include a thermostat 1502, hazard detectors 1504 (e.g., for smoke and/or carbon monoxide), cameras 1506 (e.g., indoor and/or outdoor), lighting units 1508 (e.g., indoor and outdoor), and any other types of mesh network devices 1510 that are implemented inside and/or outside of a structure 1512 (e.g., in a smart-home environment). In this example, the mesh network devices can also include any of the previously described devices, such as a border router 202, a router 102, a router-eligible end device 104, and/or an end device 106.

In the environment 1500, any number of the mesh network devices can be implemented for wireless interconnection to wirelessly communicate and interact with each other. The mesh network devices are modular, intelligent, multi-sensing, network-connected devices, which can integrate seamlessly with each other and/or with a central server or a cloud-computing system to provide any of a variety of useful smart-home objectives and implementations. An example of a mesh network device that can be implemented as any of the devices described herein is shown and described with reference to FIG. 16.

In implementations, the thermostat 1502 may include a Nest® Learning Thermostat that detects ambient climate characteristics (e.g., temperature and/or humidity) and controls a HVAC system in the smart-home environment. The learning thermostat 1502 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 1504 can be implemented to detect the presence of a hazardous substance or a substance indicative of a hazardous substance (e.g., smoke, fire, or carbon monoxide). In examples of wireless interconnection, a hazard detector 1504 may detect the presence of smoke, indicating a fire in the structure, in which case the hazard detector that first detects the smoke can broadcast a low-power wake-up signal to all of the connected mesh network devices. The other hazard detectors 1504 can then receive the broadcast wake-up signal and initiate a high-power state for hazard detection and to receive wireless communications of alert messages. Further, the lighting units 1508 can receive the broadcast wake-up signal and activate in the region of the detected hazard to illuminate and identify the problem area. In another example, the lighting units 1508 may activate in one illumination color to indicate a problem area or region in the structure, such as for a detected fire or break-in, and activate in a different illumination color to indicate safe regions and/or escape routes out of the structure. In another example, a doorbell or door monitoring system may include LEDs that flash yellow (or other color) when a presence is detected, or flash red if an alarm is activated.

In various configurations, the mesh network devices 1510 can include an entryway interface device that functions in coordination with a network-connected door lock system, and that detects and responds to a person's approach to or departure from a location, such as an outer door of the structure 1512. The entryway interface device can interact with the other mesh network devices based on whether someone has approached or entered the smart-home environment. An entryway interface device can control doorbell functionality, announce the approach or departure of a person via audio or visual means, and control settings on a security system, such as to activate or deactivate the security system when occupants come and go. The mesh network devices 1510 can also include other sensors and detectors, such as to detect ambient lighting conditions, detect room-occupancy states (e.g., with an occupancy sensor), and control a power and/or dim state of one or more lights. In some instances, the sensors and/or detectors may also control a power state or speed of a fan, such as a ceiling fan. Further, the sensors and/or detectors may detect occupancy in a room or enclosure, and control the supply of power to electrical outlets or devices, such as if a room or the structure is unoccupied.

The mesh network devices 1510 may also include connected appliances and/or controlled systems, such as refrigerators, stoves and ovens, washers, dryers, air conditioners, pool heaters, irrigation systems, security systems, and so forth, as well as other electronic and computing devices, such as televisions, entertainment systems, computers, intercom systems, garage-door openers, ceiling fans, control panels, and the like. When plugged in, an appliance, device, or system can announce itself to the mesh network as described above, and can be automatically integrated with the controls and devices of the mesh network, such as in the smart-home. It should be noted that the mesh network devices 1510 may include devices physically located outside of the structure, but within wireless communication range, such as a device controlling a swimming pool heater or an irrigation system.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 1502 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor detects that the room is dark and when the occupancy sensor detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 1508 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 1508 that lead to a safe exit. The light units 1508 may also be turned-on to indicate the direction along an exit route that a person should travel to safely exit the structure.

The various mesh network devices may also be implemented to integrate and communicate with wearable computing devices, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 1510 may also include a smart alarm clock for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 1502 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 1502 so as to pre-heat or cool the environment to a desired setting, and turning-on or turning-off the lights 1508.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

In additional scenarios, the techniques described herein for a mesh network and the mesh network devices can be implemented for third-party products and devices that are configurable and/or addressable to join and operate in the mesh network, and in the example environment 1500. Various examples of third-party products and devices that can be implemented in the example environment for wireless interconnection to wirelessly communicate and interact with each other are described following. As noted above, the third-party products and devices can be designed and implemented to integrate seamlessly with each other and/or with a central server or a cloud-computing system to provide any of a variety of useful objectives and implementations.

Appliance devices, such as the major home appliances (e.g., washer, dryer, oven and range, dishwasher, refrigerator, and the like), can operate in a mesh network, such as to refresh the laundry when the house is placed in a HOME state, or an appliance can enter into an economy mode when the house is placed in an AWAY state (e.g., all persons have left the structure). In an emergency, such as a fire or natural disaster, or based on detected weather conditions that may lead to an emergency, an appliance that uses natural gas (e.g., a stove and water heater) may be disabled. In an AWAY state of the house, a notification may be communicated to a mobile device of a user that the oven is on, or to report the status of any other appliance, such as the washer status, the refrigerator has stopped running, the furnace is running more than expected, and the like. Further, a notice that the furnace is running more than expected may also be an indication that a door or window has been left open to a cold exterior environment, or has been broken open. If a user does not respond to an appliance notification, such as a notice that the oven is on, then the system may auto turn the oven off.

An appliance (e.g., washer and dryer) may enter into a quiet mode in a HOME state of the house. If the house is in an AWAY state and a faucet is turned on for hot water, then the system can initiate the house HOME state. Further appliance use can provide an indication of occupancy as well as the approximate number of occupants. If the occupants of a structure are away for a designated number of hours or days, the system can communicate a request to enter into an eco-mode, which a user may then approve remotely on the mobile device. Additionally, the system may initiate a warning if an appliance is activated during RHR (conserving energy during peak use times), reduce hot water flow during RHR, activate the central heating and cooling system to push or pull air during an emergency or if an alarm is activated, adjust the thermostat or set some other mesh network device set point based on the oven temperature or the oven being on, and communicate a report of water and/or electrical use to the mobile device of the user.

Doors and windows that have blinds, shades, or other types of coverings, or that may be electrochromic, can be automatically activated, such as to lower the shades during evening hours or in a house AWAY state. The shades may also be closed to lower the temperature rather than turning on the HVAC, or if direct sunlight is detected. Alternatively, the shades can open if an alarm goes off, or close if RHR. Similarly, electric fans can be turned on if RHR, or a fan can be reversed if heating the structure or environment. A fan state, speed, or other characteristic can be used as a basis to change another mesh network device set point. Further, energy usage data can be communicated to the mobile device of the user. If the HVAC unit is heating or cooling, a fan can be operated in a destratification (reverse) mode. If the house is set to an AWAY mode, a fan may be turned-on periodically and/or activated for the same limited duration as the HVAC fan. During an alarm, any externally vented fans can be activated. The HVAC may have multiple sensor inputs to determine the occupancy of a home environment for customized temperature control.

Electric vehicle charging can be DR-based, stopped if a hazard is detected, or a user given the option to delay charging during RHR. Additionally, energy use data for electric vehicle charging can be uploaded, and the system can learn a schedule, such as to precondition the vehicle for use based on when a user typically leaves and takes the vehicle.

Home lighting can be set to turn on or off based on the house HOME mode or AWAY mode, and motion sensing can be used to determine or set the house HOME mode. If the house is in the AWAY mode, the system can turn the lights on and off randomly. Less efficient lights can be used less often. Home "scenes" can be created with ambience and lighting, such as a dinner scene, movie-watching scene, romantic scene, and the like. As noted above, the lights may illuminate the color red to indicate a hazard or emergency, and then change to a bright white to illuminate an exit path out of the structure. The lights can also be turned off or dimmed for RHR, turned on or off based on the temperature, and/or have different start, during, and end colors.

Motion sensing can be integrated to switch on lights and activate the HOME mode. Light activation can be monitored to detect occupancy, and if there are no detected occupants, a message can be communicated requesting to deactivate the HVAC. With respect to camera integration and imaging, the light brightness may be increased for camera imaging if motion is detected. If a light breaks, a camera can zoom on the light. The lights can be adjusted based on detected users, user profiles, and/or to adjust the lighting or temperature. A lighting schedule can be learned for the house HOME mode and AWAY mode, and light actuations indicate or activate the HOME mode. If an alarm is activated, then all of the outdoor lights can be activated and/or illuminate different colors, such as the swimming pool lights, flood lights and other outdoor lights. The lights may also be turned on steady, flashing, random, or in some pattern that indicates a warning or alarm. If an alarm is activated, the lights can illuminate heads-up status colors, such as yellow as a caution or red as a warning. A subset of the lights can illuminate to indicate the location and presence of an intruder. The lights can also turn on to illuminate a safe exit path out of the structure, such as based on the home environment sensor determinations.

If a door lock is unlocked, the house HOME mode can be initiated, and similarly, if an occupant leaves and locks the door, the house AWAY mode can be set. The status of the locks can be polled by the system less frequently if an occupant is present and in the house HOME mode, and polled more often in the house AWAY mode. Further, if a low-battery condition is encountered and the house is in the AWAY mode, the feature can hibernate to conserve battery power of the lock-based mesh network device. A lock-based device can be designed to operate based on a pin code plus BLE authentication, and a lock or unlock state can be used for occupancy determinations, and/or combined with other sensor information for the occupancy determinations. An unexpected door unlock can initiate an alarm, such as if a user is on vacation, and unlock messages can be communicated to the mobile device of the user. Further, when the user arrives or leaves, notifications can be initiated for display on the screen of the mobile device.

Wireless sensor devices of all types can be implemented to operate in the mesh network and provide temperature and other readings to a user and any of the other mesh network devices. From a services standpoint, the house AWAY mode and HVAC settings may be initiated when a user checks-in somewhere else, which may also be based on a location services input and/or a calendar event. The system may also be implemented for reservation, alarm interactions, and/or voice control of the thermostat or any of the other mesh network devices. Guests of a home may be allowed to control some features and aspects of the system based on proximity. Sensors may also facilitate temporary camera access and temporary key access for guests. Further, a guest's own home may be controlled and an AWAY mode initiated based on occupancy detected in another structure that includes a mesh network environment. A room may also be automatically photographed before guest arrival and after the guest leaves, and too many guests can also be detected.

Solar power devices can communicate in the mesh network to control a thermostat, charge an electric vehicle, and/or activate appliances based on the weather forecast and stored charge. Switches and plugs can be implemented, along with occupancy sensors, for many of the features described herein, such as to activate an alarm device, deactivate devices during RHR (Rush Hour Rewards), communicate energy consumption notifications, for user detection, etc. A VOIP system can be integrated to forward calls for a user, such as in the house AWAY mode or to call 911 emergency if an alarm is activated. The VOIP system can also monitor for scheduled HOME mode times and initiate a call to the user if the house HOME state is not entered.

Audio and video features can be implemented to turn down televisions and audio equipment during emergency, hazard, and alarm situations, and turn on or off devices in the house HOME state and house AWAY state. An alarm can also be propagated (e.g., rebroadcast) over the mesh network devices as a message at a particular decibel level. The audio can also be switched based on the house state, and IR sensors and application usage can indicate the house HOME state. An audio system can be used to propagate an audio alarm over the speakers of the system and/or a sound can be played if a camera detects an intruder. The audio system, as well as any of the mesh network devices, can be turned on or off based on an ETA of a person arriving home.

An automobile can be integrated generally as a mesh network device in the example environment, and communicate the ETA of the person arriving home. The house HOME state and house AWAY state can be initiated based on the provided ETA, when reversing and leaving structure, or when the ETA is based on a threshold, including use of thermal transition time to warm or cool the structure. Features of geo-fence can also be incorporated for use in the mesh network. Similar to the mobile device of the user, the automobile can display in-vehicle status of any of the mesh network devices, and/or the mesh network overall, to include camera images and video feeds. The automobile (vehicle) can be preconditioned for use based on the thermostat setting in the house so that the user environment temperature is maintained as the user transitions from the house to the vehicle, or vice-versa. Microlocation control of the structure in the example environment can be used to actuate entry points, such as to open the garage door on arrival, but not unlock any other entry doors of the structure (or any other combination thereof). The opening and closing of the garage door can also be used to initiate either of the house HOME state or the house AWAY state. The garage door can also be opened or closed based on detecting that the temperature is too hot or cold. The garage door can be opened or closed based on alarms, such as for smoke or CO, and if forced open, the system can activate cameras.

Personal health and monitoring devices can be incorporated in the mesh network and example environment 1500. Further, wearable devices can also be integrated as any type of mesh network device that is operable to implement many of the various features described herein. For example, a bed cover or wearable device may detect a user sleeping and the thermostat state for the room is adjusted to accommodate the user preferences and/or profile. A wake-up temperature can also be based on bed cover motion or a wearable device, and the house HOME state initiated, to include lights, music, television, etc. A baby's status and/or temperature can be communicated to the mobile device of the user, a camera turned on based on the baby status, and a baby monitor vibrates and/or escalates an alarm activation in the system, such as if the baby monitor leaves a geofence, the alarm can be activated. Mesh network devices for baby needs may be more stringent, such as to accommodate less temperature drift for baby settings. A user's body temperature can be determined by a wearable device and the HVAC adjusted accordingly. A pet wearable device for pet detection can be used to reduce camera false triggers.

Alternatively or in addition to the many camera features listed above, one or more of the cameras can be used to initiate notifications if the house AWAY state is set. A camera can activate and deactivate based on either a manual or automatic switching between house HOME state and house AWAY state. If an alarm is activated, an image clip is sent as a notification, such as to the mobile device of the user, and a video history may also be included. When a doorbell or door knock is detected (e.g., by microphone, sensor contact, etc.) a camera is turned-on, an image or video is captured, and the image or video is communicated for viewing, either on a display device in the house or on the mobile device of the user. If the user leaves the structure, a wearable device can initiate turning on a camera and upon returning, initiate turning off the camera. Similarly, if a user falls asleep, the wearable device can detect the sleeping and initiate turning on a camera and upon waking, initiate turning off the camera. If motion is detected in a zone, and the structure is unoccupied (e.g., house AWAY state) the system can initiate to simulate as if someone is in the structure by turning on music, lights, etc. Similarly, if no motion is detected for an extended time, the system can initiate to simulate as if someone is home. Facial recognition can be implemented to support user preferences and/or profiles. Generally, a video clip, audio recording, or image can be captured and/or generated for any event that is detected in the example environment of the mesh network. Further, third-party access points into the mesh network provide notification and subsequent links to relevant cameras.

The shower and faucets can be controlled as mesh network devices in the example environment. For example, during an alarm, the shower or a faucet that is in use can be changed to run cold water, or an LED ring around the shower head can be activated to indicate an alarm. Similarly, for a person at the door, the shower may turn cold and/or LED lights activated to notify the user. Generally for home automation, the mesh network devices can be controlled based on the thermostat, alarms, motions, detected audio, hazards, and other properties and features. For RHR, a fan can be turned on, the window shades closed, and the lights turned-off. A scene can be set, to include setting the temperature, window shades, music, etc. An alarm clock can announce or alarm detected camera motion events, and open an audio feed. The alarm clock can be used to facilitate many of the features, such as to announce alarms, programming sleep and awake temperatures, lighting, and alarms, and to announce RHR.

Remote control devices can also be implemented as mesh network devices to control and activate any of the mesh network devices and features described herein, such as to turn down audio and video when a hazard condition is detected or an alarm is activated. Remote control devices may also be used for audio recordings, to answer system questions, and announce RHR. Features and aspects of insurance protection may also be incorporated, such as to automatically mail batteries for the mesh network devices when a low-battery condition is detected, particularly in the smoke and CO detectors. An insurance carrier may also be notified when an alarm condition is activated, so that support can be provided, such as after a fire or break-in.

Other third-party products and devices that can be designed to operate in a mesh network and/or in the example environment 1500 can include baby and pet monitoring devices, other Internet-of-things (IoT) devices, software stack providers, RF modules and development kits, access points and hub devices, load control switches, security-based devices, RFID tags and beacon devices, drones and bot devices, energy storage equipment and devices, hobby devices, metering units and devices, PERS, weather station devices, utilities, and/or for any other type of products and mesh network devices. For example, swimming pool heaters and pumps can be turned-off as non-essential pool elements when the house is in the AWAY mode or during RHR to conserve energy. For cloud-based features that are associated with the mesh network, ISP/MSO features can be implemented, such as to provide that a user can view the thermostat state (or state of any mesh network devices) at a glance. The sprinkler system may be activated and turned-on if an intruder alarm or fire alarm is activated. A water usage message can also be communicated to the mobile device of the user. A vacuum system can be set to clean when the house AWAY state is initiated.

Figure 16:
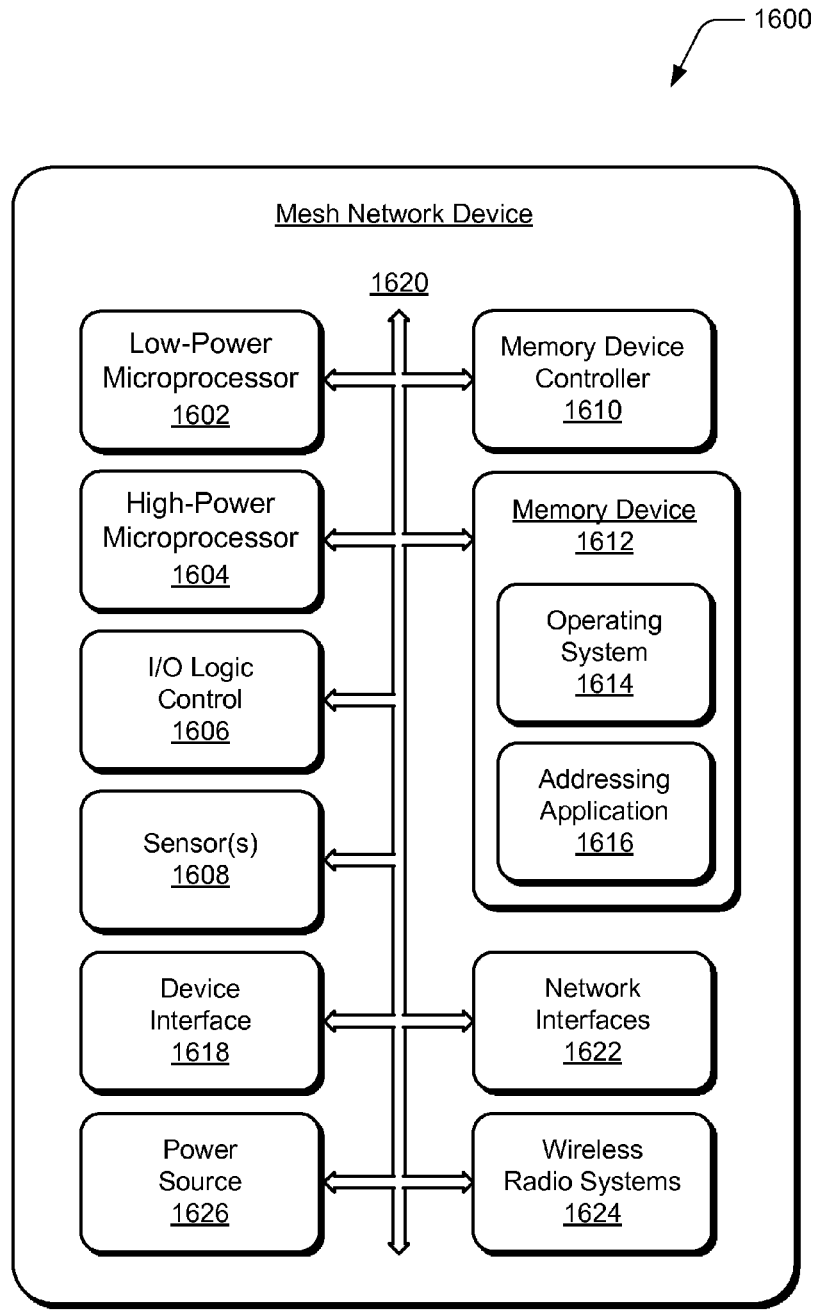
FIG. 16 illustrates an example mesh network device that can be implemented in a mesh network environment in accordance with one or more embodiments of the techniques described herein.

FIG. 16 illustrates an example mesh network device 1600 that can be implemented as any of the mesh network devices in a mesh network in accordance with one or more embodiments of mesh network addressing as described herein. The device 1600 can be integrated with electronic circuitry, microprocessors, memory, input output (I/O) logic control, communication interfaces and components, as well as other hardware, firmware, and/or software to implement the device in a mesh network. Further, the mesh network device 1600 can be implemented with various components, such as with any number and combination of different components as further described with reference to the example device shown in FIG. 17.

In this example, the mesh network device 1600 includes a low-power microprocessor 1602 and a high-power microprocessor 1604 (e.g., microcontrollers or digital signal processors) that process executable instructions. The device also includes an input-output (I/O) logic control 1606 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1602 and the high-power microprocessor 1604 can also support one or more different device functionalities of the device. For example, the high-power microprocessor 1604 may execute computationally intensive operations, whereas the low-power microprocessor 1602 may manage less complex processes such as detecting a hazard or temperature from one or more sensors 1608. The low-power processor 1602 may also wake or initialize the high-power processor 1604 for computationally intensive processes.

The one or more sensors 1608 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1608 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 1600 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 1600 includes a memory device controller 1610 and a memory device 1612, such as any type of a nonvolatile memory and/or other suitable electronic data storage device. The mesh network device 1600 can also include various firmware and/or software, such as an operating system 1614 that is maintained as computer executable instructions by the memory and executed by a microprocessor. The device software may also include an addressing application 1616 that implements embodiments of mesh network addressing. The mesh network device 1600 also includes a device interface 1618 to interface with another device or peripheral component, and includes an integrated data bus 1620 that couples the various components of the mesh network device for data communication between the components. The data bus in the mesh network device may also be implemented as any one or a combination of different bus structures and/or bus architectures.

The device interface 1618 may receive input from a user and/or provide information to the user (e.g., as a user interface), and a received input can be used to determine a setting. The device interface 1618 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1618 may also receive inputs from any number of peripherals, such as buttons, a keypad, a switch, a microphone, and an imager (e.g., a camera device).

The mesh network device 1600 can include network interfaces 1622, such as a mesh network interface for communication with other mesh network devices in a mesh network, and an external network interface for network communication, such as via the Internet. The mesh network device 1600 also includes wireless radio systems 1624 for wireless communication with other mesh network devices via the mesh network interface and for multiple, different wireless communications systems. The wireless radio systems 1624 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 1600 also includes a power source 1626, such as a battery and/or to connect the device to line voltage. An AC power source may also be used to charge the battery of the device.

Figure 17:
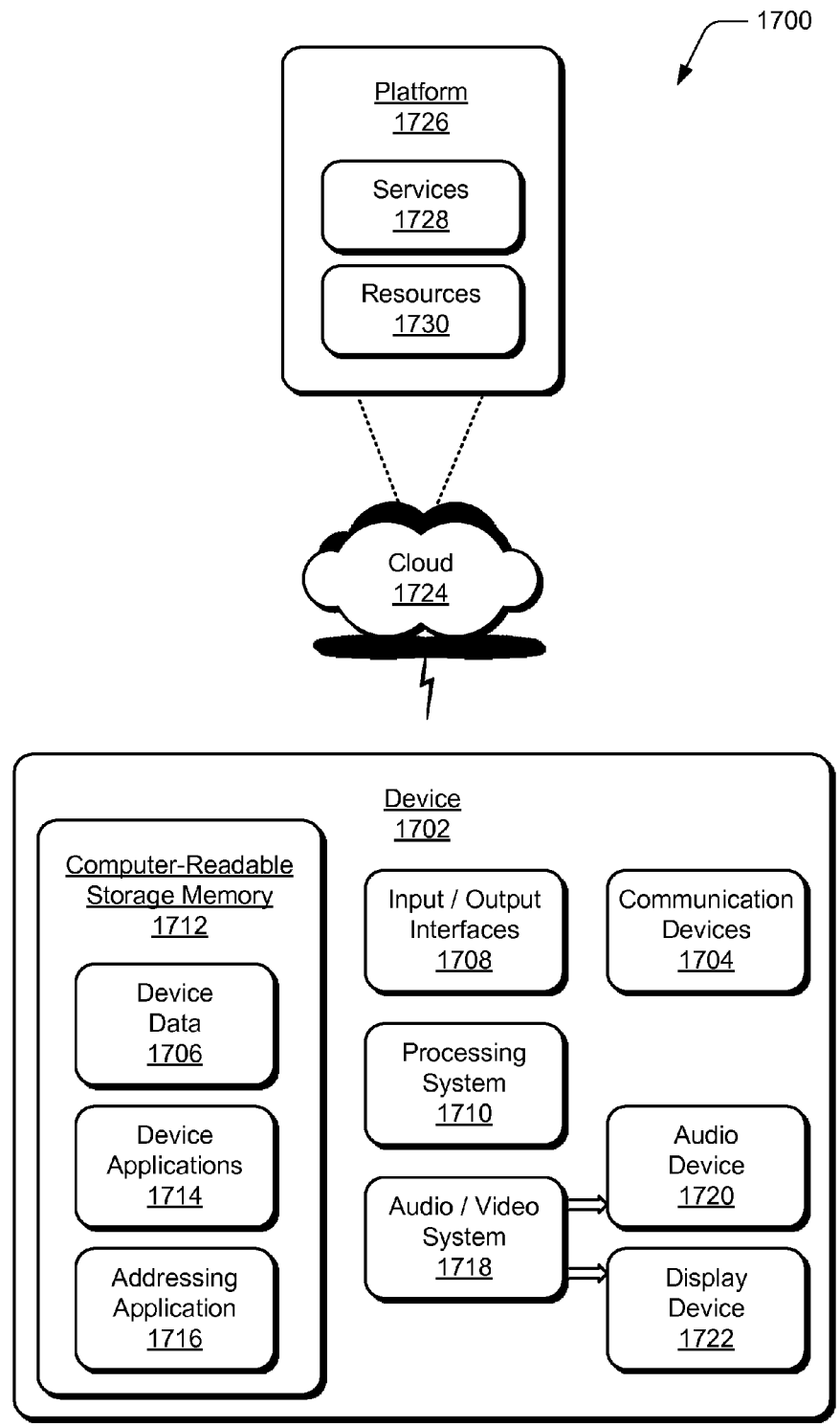
FIG. 17 illustrates an example system with an example device that can implement embodiments of mesh network addressing.

FIG. 17 illustrates an example system 1700 that includes an example device 1702, which can be implemented as any of the mesh network devices that implement embodiments of mesh network addressing as described with reference to the previous FIGS. 1-16. The example device 1702 may be any type of computing device, client device, mobile phone, tablet, communication, entertainment, gaming, media playback, and/or other type of device. Further, the example device 1702 may be implemented as any other type of mesh network device that is configured for communication on a mesh network, such as a thermostat, hazard detector, camera, light unit, router, border router, joiner router, joining device, end device, leader, access point, and/or other mesh network devices.

The device 1702 includes communication devices 1704 that enable wired and/or wireless communication of device data 1706, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 1704 can also include transceivers for cellular phone communication and/or for network data communication.

The device 1702 also includes input/output (I/O) interfaces 1708, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1702 includes a processing system 1710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1702 may further include any type of a system bus or other data and command transfer system that couples the various components within the device. A system bus can include any one or combination of different bus structures and architectures, as well as control and data lines.

The device 1702 also includes computer-readable storage memory 1712, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1712 provides storage of the device data 1706 and various device applications 1714, such as an operating system that is maintained as a software application with the computer-readable storage memory and executed by the processing system 1710. The device applications may also include a device manager, such as any form of a control application, software application, signal processing and control module, code that is native to a particular device, a hardware abstraction layer for a particular device, and so on. In this example, the device applications also include a addressing application 1716 that implements embodiments of mesh network addressing, such as when the example device 1702 is implemented as any of the mesh network devices described herein.

The device 1702 also includes an audio and/or video system 1718 that generates audio data for an audio device 1720 and/or generates display data for a display device 1722. The audio device and/or the display device include any devices that process, display, and/or otherwise render audio, video, display, and/or image data, such as the image content of a digital photo. In implementations, the audio device and/or the display device are integrated components of the example device 1702. Alternatively, the audio device and/or the display device are external, peripheral components to the example device. In embodiments, at least part of the techniques described for mesh network addressing may be implemented in a distributed system, such as over a "cloud" 1724 in a platform 1726. The cloud 1724 includes and/or is representative of the platform 1726 for services 1728 and/or resources 1730.

The platform 1726 abstracts underlying functionality of hardware, such as server devices (e.g., included in the services 1728) and/or software resources (e.g., included as the resources 1730), and connects the example device 1702 with other devices, servers, etc. The resources 1730 may also include applications and/or data that can be utilized while computer processing is executed on servers that are remote from the example device 1702. Additionally, the services 1728 and/or the resources 1730 may facilitate subscriber network services, such as over the Internet, a cellular network, or Wi-Fi network. The platform 1726 may also serve to abstract and scale resources to service a demand for the resources 1730 that are implemented via the platform, such as in an interconnected device embodiment with functionality distributed throughout the system 1700. For example, the functionality may be implemented in part at the example device 1702 as well as via the platform 1726 that abstracts the functionality of the cloud 1724.

Although embodiments of mesh network addressing have been described in language specific to features and/or methods, the subject of the appended claims is not necessarily limited to the specific features or methods described. Rather, the specific features and methods are disclosed as example implementations of mesh network addressing, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of addressing a data packet in a mesh network, the method comprising:
   receiving, at a router device, a packet to deliver to a network destination;
   determining if the network destination is a destination on the mesh network;
   sending an address query over the mesh network, using multicast addressing, to find a Routing Locator (RLOC) associated with the network destination; and
   forwarding the packet, using the RLOC to provide a routable network address for a destination address for the packet.

2. The method as recited in claim 1, further comprising searching a cache in the router device to find the RLOC.

3. The method as recited in claim 2, wherein the router device sends the address query if the RLOC is not found in the cache.

4. The method as recited in claim 2, the method further comprising:
   obtaining EID-to-RLOC mappings opportunistically, by the router device, by observing mesh network traffic routed through the router device; and
   storing the EID-to-RLOC mappings, from the observed mesh network traffic, in the cache of the router device.

5. The method as recited in claim 1, wherein the destination address is an IPv6 address.

6. The method as recited in claim 1, wherein the network destination is an Endpoint Identifier (EID) associated with a mesh network device, and wherein the RLOC provides a mapping of the EID to the routable network address.

7. The method as recited in claim 1, the method further comprising:
   limiting a number of hops for the multicast address query; and
   sending a second multicast address query, if the RLOC is not returned, the number of hops being set to a larger number of hops.

8. The method as recited in claim 1, wherein the multicast addressing of the address query designates that the address query is addressed to all routers and router-eligible end devices in the mesh network.

9. A mesh network device implemented as a router device, the mesh network device comprising:
   a mesh network interface configured for communication in a mesh network;
   a memory and processor system to implement an addressing application that is configured to:
      receive a packet to deliver to a network destination;
      determine if the network destination is a destination on the mesh network;
      send an address query over the mesh network, using multicast addressing, to find a Routing Locator (RLOC) associated with the network destination; and
      forward the packet, using the RLOC to provide a routable network address for a destination address for the packet.

10. The mesh network device as recited in claim 9, wherein the addressing application is configured to search a cache of RLOCs, stored in the router device, to find the RLOC.

11. The mesh network device as recited in claim 10, wherein the addressing application is configured to send the address query if the RLOC is not found in the cache.

12. The mesh network device as recited in claim 9, wherein the addressing application is configured to limit a number of hops for the multicast address query.

13. The mesh network device as recited in claim 9, wherein the destination address is an IPv6 address.

14. The mesh network device as recited in claim 9, wherein the network destination is an Endpoint Identifier (EID) associated with a mesh network device, and wherein the RLOC provides a mapping of the EID to the routable network address.

15. A mesh network system, comprising:
   an end device configured to forward a packet in a mesh network, the packet comprising a network destination; and
   a router device configured to:
      receive the packet, from the end device, to deliver to a network destination;
      determine if the network destination is a destination on the mesh network;
      send an address query over the mesh network, using multicast addressing, to find a Routing Locator (RLOC) associated with the network destination; and
      forward the packet, using the RLOC to provide a routable network address for a destination address for the packet.

16. The mesh network system as recited in claim 15, wherein the router device is configured to search a cache of RLOCs, stored in the router device, to find the RLOC.

17. The mesh network system as recited in claim 16, wherein the router device is configured to send the address query if the RLOC is not found in the cache.

18. The mesh network system as recited in claim 15, wherein the router device is configured to limit a number of hops for the multicast address query.

19. The mesh network system as recited in claim 15, wherein the destination address is an IPv6 address.

20. The mesh network system as recited in claim 15, wherein the network destination is an Endpoint Identifier (EID) associated with a mesh network device, and wherein the RLOC provides a mapping of the EID to the routable network address.

* * * * *